US012601603B2

(12) United States Patent
Chen et al.

(10) Patent No.: US 12,601,603 B2
(45) Date of Patent: Apr. 14, 2026

(54) CARBON FOOTPRINT OPTIMIZED TIMELY E-TRUCK TRANSPORTATION

(71) Applicant: City University of Hong Kong, Hong Kong (CN)

(72) Inventors: Minghua Chen, Hong Kong (CN); Junyan Su, Hong Kong (CN); Qiulin Lin, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 282 days.

(21) Appl. No.: 18/436,350

(22) Filed: Feb. 8, 2024

(65) Prior Publication Data

US 2025/0258006 A1     Aug. 14, 2025

(51) Int. Cl.
*G01C 21/34* (2006.01)

(52) U.S. Cl.
CPC ................................ *G01C 21/3469* (2013.01)

(58) Field of Classification Search
CPC .......................... G01C 21/3469; G01C 21/343
See application file for complete search history.

(56) References Cited

U.S. PATENT DOCUMENTS

| | | | | |
|---|---|---|---|---|
| 9,857,186 | B2 * | 1/2018 | Zhou .................. | G01C 21/3469 |
| 2011/0112759 | A1 * | 5/2011 | Bast .................. | G01C 21/3423 |
| | | | | 701/533 |
| 2020/0239025 | A1 * | 7/2020 | Nagy ..................... | G05D 1/646 |
| 2022/0163969 | A1 * | 5/2022 | Li .................... | G08G 1/096811 |

OTHER PUBLICATIONS

Ashby, B. H. Protecting perishable foods during transport by truck. No. 669. US Department of Agriculture, Office of Transportation, 1987.
Baum, M., Dibbelt, J., Gemsa, A., Wagner, D., and Zundorf, T. Shortest Feasible Paths with Charging Stops for Battery Electric Vehicles. Transportation Science 53 (2019), 1627-1655.
(Continued)

*Primary Examiner* — Khoi H Tran
*Assistant Examiner* — Tristan J Greiner
(74) *Attorney, Agent, or Firm* — S&F/WEHRW

(57) ABSTRACT

Carbon footprint optimization of an electric vehicle, such as a heavy-duty e-truck, traveling in a trip across a highway network subject to a hard deadline constraint and one or more battery state-of-charge (SoC) constraints is carried out by co-determining a route plan, a speed plan and an intermediary charging plan for the electric vehicle with an objective of minimizing a carbon footprint incurred in the trip. In co-determining the three plans, a stage-expanded graph for modeling possible routing decisions of routing the trip in the highway network and possible charging decisions of charging the electric vehicle during the trip is constructed. The stage-expanded graph embeds information of arrival time and arrival SoC to facilitate modeling the charging decisions. The three plans are optimized by a dual subgradient method according to the stage-expanded graph under the objective of minimizing the carbon footprint while satisfying the constraints.

5 Claims, 10 Drawing Sheets

Property 1: The stages are connected by virtual charging edges.
Property 2: The time duration of each stage is variable.

(56) References Cited

OTHER PUBLICATIONS

Baum, M., Dibbelt, J., Hubschle-Schneider, L., Pajor, T., and Wagner, D. Speed—Consumption Tradeoff for Electric Vehicle Route Planning. In 14Th Workshop on Algorithmic Approaches for Transportation Modelling, Optimization, and Systems (2014), Schloss Dagstuhl—Leibniz-Zentrum fuer Informatik GmbH, Wadern/Saarbruecken, Germany, p. 14 pages.

Baum, M., Dibbelt, J., Wagner, D., and Zundorf, T. Modeling and Engineering Constrained Shortest Path Algorithms for Battery Electric Vehicles. Transportation Science 54 (2020), 1571-1600.

Bazaraa, M. S., and Sherali, H. D. On the choice of step size in subgradient optimization. European Journal of Operational Research 7, 4 (1981), 380-388.

Bekta,s, T., and Laporte, G. The Pollution-Routing Problem. Transportation Research Part B: Methodological 45 (2011), 1232-1250.

Bibra, E. M., Connelly, E., Dhir, S., Drtil, M., Henriot, P., Hwang, I., Le Marois, J.-B., McBain, S., Paoli, L., and Teter, J. Global EV outlook 2022: Securing supplies for an electric future.

Camerini, P. M., Fratta, L., and Maffioli, F. On improving relaxation methods by modified gradient techniques. In Nondifferentiable Optimization, M. L. Balinski and p. Wolfe, Eds., vol. 3. Springer Berlin Heidelberg, 1975, pp. 26-34. Series Title: Mathematical Programming Studies.

Cela, A., Jurik, T., Hamouche, R., Natowicz, R., Reama, A., Niculescu, S.-I., and Julien, J. Energy Optimal Real-Time Navigation System. IEEE Intelligent Transportation Systems Magazine 6 (2014), 66-79.

Deng, L., Hajiesmaili, M. H., Chen, M., and Zeng, H. Energy-efficient timely transportation of long-haul heavy-duty trucks. IEEE Transactions on Intelligent Transportation Systems 19 (2017), 2099-2113.

Desaulniers, G., Errico, F., Irnich, S., and Schneider, M. Exact Algorithms for Electric Vehicle-Routing Problems with Time Windows. Operations Research 64 (2016), 1388-1405.

Erdogan, S., and Miller-Hooks, E. A green vehicle routing problem. Transportation research part E: logistics and transportation review 48, 1 (2012), 100-114.

Farr, T. G., Rosen, P. A., Caro, E., Crippen, R., Duren, R., Hensley, S., Kobrick, M., Paller, M., Rodriguez, E., Roth, L., et al. The shuttle radar topography mission. Reviews of geophysics 45, 2 (2001).

Ferna'ndez, E., Leitner, M., Ljubic', I., and Ruthmair, M. Arc routing with electric vehicles: dynamic charging and speed-dependent energy consumption. Transportation Science (2022).

Goeke, D., and Schneider, M. Routing a mixed fleet of electric and conventional vehicles. European Journal of Operational Research 245 (2015), 81-99.

Gonder, J. D., Brooker, A. D., Wood, E. W., and Moniot, M. Future automotive systems technology simulator (fastsim) validation report. Tech. rep., National Renewable Energy Lab. (NREL), Golden, CO (United States), 2018.

Hancock, M. W., and Wright, B. A policy on geometric design of highways and streets. American Association of State Highway and Transportation Officials: Washington, DC, USA (2013).

Hartmann, F., and Funke, S. Energy-Efficient Routing: Taking Speed into Account. In KI 2014: Advances in Artificial Intelligence (Cham, 2014), C. Lutz and M. Thielscher, Eds., Lecture Notes in Computer Science, Springer International Publishing, pp. 86-97.

Hassin, R. Approximation schemes for the restricted shortest path problem. Mathematics of Operations research 17, 1 (1992), 36-42.

Hellstrom, E., Ivarsson, M., Aslund, J., and Nielsen, L. Look-ahead control for heavy trucks to minimize trip time and fuel consumption. Control Engineering Practice 17, 2 (2009), 245-254.

Hu, X., Xu, L., Lin, X., and Pecht, M. Battery lifetime prognostics. Joule 4, 2 (2020), 310-346.

Hwang, H.-L., Hargrove, S., Chin, S.-M., Wilson, D. W., Lim, H., Chen, J., Taylor, R., Peterson, B., and Davidson, D. The freight analysis framework verson 4 (faf4)-building the faf4 regional database: Data sources and estimation methodologies. Tech. rep., Oak Ridge National Lab.(ORNL), Oak Ridge, TN (United States), 2016.

Juttner, A., Szviatovski, B., Me' cs, I., and Rajko', Z. Lagrange relaxation based method for the qos routing problem. In Proceedings IEEE INFOCOM 2001. Conference on Computer Communications. Twentieth Annual Joint Conference of the IEEE Computer and Communications Society (Cat. No. 01CH37213) (2001), vol. 2, IEEE, pp. 859-868.

Liu, Q., Zeng, H., and Chen, M. Energy-Efficient Timely Truck Transportation for Geographically-Dispersed Tasks. In Proceedings of the Ninth International Conference on Future Energy Systems (Karlsruhe Germany, 2018), ACM, pp. 324-339.

Liu, Y., Seah, H. S., and Shou, G. Constrained energy-efficient routing in time-aware road networks. GeoInformatica 21 (2017), 89-117.

Lorenz, D. H., and Raz, D. A simple efficient approximation scheme for the restricted shortest path problem. Operations Research Letters 28, 5 (2001), 213-219.

Maji, D., Sitaraman, R. K., and Shenoy, P. DACF: day-ahead carbon intensity forecasting of power grids using machine learning. In Proceedings of the Thirteenth ACM International Conference on Future Energy Systems (2022), ACM, pp. 188-192.

Montoya, A., Gue' ret, C., Mendoza, J. E., and Villegas, J. G. The electric vehicle routing problem with nonlinear charging function. Transportation Research Part B: Methodological 103 (2017), 87-110.

Pelletier, S., Jabali, O., Laporte, G., and Veneroni, M. Battery degradation and be-haviour for electric vehicles: Review and numerical analyses of several models. Transportation Research Part B: Methodological 103 (2017), 158-187.

Schneider, M., Stenger, A., and Goeke, D. The Electric Vehicle-Routing Problem with Time Windows and Recharging Stations. Transportation Science 48 (2014), 500-520.

Storandt, S. Quick and energy-efficient routes: Computing constrained shortest paths for electric vehicles. In Proceedings of the 5th ACM SIGSPATIAL International Workshop on Computational Transportation Science (New York, NY, USA, 2012), IWCTS '12, Association for Computing Ma-chinery, pp. 20-25.

Strehler, M., Merting, S., and Schwan, C. Energy-efficient shortest routes for electric and hybrid vehicles. Transportation Research Part B: Methodological 103 (2017), 111-135.

Su, J., Chen, M., and Zeng, H. Energy efficient timely transportation: A comparative study of internal combustion trucks and electric trucks. In Proceedings of the 8th ACM International Conference on Systems for Energy-Efficient Buildings, Cities, and Transportation (New York, NY, USA, 2021), BuildSys '21, Association for Computing Machinery, p. 224-225.

Wang, Y., Jiang, J., and Mu, T. Context-Aware and Energy-Driven Route Optimization for Fully Electric Vehicles via Crowdsourcing. IEEE Transactions on Intelligent Transportation Systems 14 (2013), 1331-1345.

Xu, W., Liu, Q., Chen, M., and Zeng, H. Ride the Tide of Traffic Conditions: Opportunistic Driving Improves Energy Efficiency of Timely Truck Transportation. In Proceedings of the 6th ACM International Conference on Systems for Energy-Efficient Buildings, Cities, and Transportation (New York, NY, USA, 2019), BuildSys '19, Association for Computing Machinery, pp. 169-178.

Zhang, Y., Qu, X., and Tong, L. Optimal eco-driving control of autonomous and electric trucks in adaptation to highway topography: Energy minimization and battery life extension. IEEE Transactions on Transportation Electrification 8, 2 (2022), 2149-2163.

Zhou, R., Liu, Q., Xu, W., Chen, M., and Zeng, H. Minimizing emission for timely truck transportation with adaptive fuel injection. In Proceedings of the 7th ACM International Conference on Systems for Energy-Efficient Buildings, Cities, and Transportation (2020), pp. 240-249.

J. Su, Q. Lin and M. Chen, "Follow the Sun and Go with the Wind: Carbon Footprint Optimized Timely E-Truck Transportation", in Proceedings of 14th International Conference on Future Energy Systems (ACM e-Energy 2023), Orlando, Florida, published Jun. 16, 2023.

* cited by examiner

Property 1:  The stages are connected by virtual charging edges.
Property 2:  The time duration of each stage is variable.

|  | Carbon footprint (kg) | Energy (kWh) | Distance (miles) | Time (hours) |
|---|---|---|---|---|
| FAST | 1022.0 | 1633.7 | 919.9 | 19.3 |
| ENERGY | 637.3 | 1239.7 | 879.8 | 24.0 |
| CARBON | 413.6 | 1487.5 | 946.9 | 24.0 |

Construct a stage-expanded graph for modeling possible routing decisions and possible charging decisions.

720

Optimize the route plan, speed plan and intermediary charging plan according to the stage-enhanced graph.

700

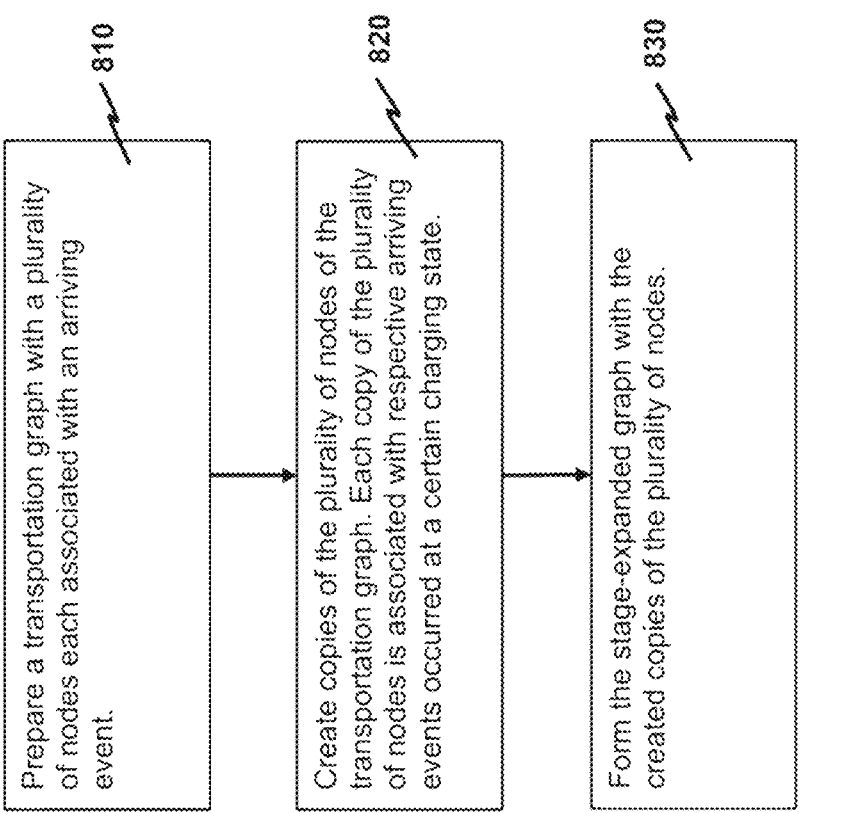

Prepare a transportation graph with a plurality of nodes each associated with an arriving event.

810

Create copies of the plurality of nodes of the transportation graph. Each copy of the plurality of nodes is associated with respective arriving events occurred at a certain charging state.

820

Form the stage-expanded graph with the created copies of the plurality of nodes.

Provide navigation instructions and charging advices according to the route plan, speed plan and intermediary charging plan.

CARBON FOOTPRINT OPTIMIZED TIMELY E-TRUCK TRANSPORTATION

PRIOR DISCLOSURES BY THE INVENTOR OR A JOINT INVENTOR

Part of the present invention was disclosed in a paper published as "Follow the Sun and Go with the Wind: Carbon Footprint Optimized Timely E-Truck Transportation", in *Proceedings of* 14*th International Conference on Future Energy Systems* (*ACM e-Energy* 2023), Orlando, Florida, published Jun. 16, 2023. This paper is a grace period inventor-originated disclosure disclosed within one year before the effective filing date of this application. This paper is hereby incorporated by reference in its entirety.

ABBREVIATIONS

CFO carbon footprint optimization
$CO_2$ carbon dioxide
DoD depth of discharge
E2T2 energy-efficient timely transportation
EIA Energy Information Administration
e-truck electric truck
EV electric vehicle
EVRP electric vehicle routing problem
FAF Freight Analysis Framework
ICE internal combustion engine
ILP integer linear program
METAL Map-based Educational Tools for Algorithm Learning
MIP mixed-integer programming
OSM OpenStreetMap
PASO path selection and speed optimization
RSP restricted shortest path
SRTM Shuttle Radar Topography Mission
SoC State of charge
VRP vehicle routing problem

TECHNICAL FIELD

This application relates to CFO of an electric vehicle, e.g., a heavy-duty e-truck, traveling from an origin to a destination across a highway network subject to a hard deadline by optimizing route planning, speed planning, and intermediary charging planning with an objective of minimizing a carbon footprint.

BACKGROUND

In the United States, heavy-duty trucks deliver more than 10 billion tons of freight in 2021, representing 72.2% of total domestic tonnage shipped. 80.4% of the nation's freight bills are from trucking which amounts to 875 billion US dollars. Despite their importance for the economy, heavy-duty trucks are a major source of $CO_2$ emission, which is tied to climate change. With only 4% of the total vehicle population, heavy-duty trucks produce 25% of the $CO_2$ emitted in the transportation sector, accounting for 8.8% of the total carbon emissions in the US [13]. To fight climate change, it is critical to de-carbonize the trucking industry.

Electrification of heavy-duty trucks is a promising endeavor with multi-facet benefits, including lower noise disturbance, better acceleration performance, better energy efficiency, and most notably, zero tailpipe emissions [7] with great potential to de-carbonize the trucking industry. However, while e-trucks do not generate direct $CO_2$ emission during the operation, charging e-trucks incurs positive carbon footprint, i.e. the $CO_2$ emission during the production of electricity to be consumed by the e-truck. It is thus essential to evaluate the carbon footprint of e-trucks in contrast to the tailpipe emission for ICE trucks [43].

In the present disclosure, we study the CFO of a heavy-duty e-truck traveling from an origin to a destination across a national highway network subject to a hard deadline, by exploring the complete design space of path planning, speed planning, and intermediary charging planning. Such a CFO problem is central to maximizing the environmental benefit brought by e-trucks. However, it is notoriously challenging to solve due to the following.

The hard deadline constraint. Transportation deadline is a common requirement in the trucking industry. In fact, timely delivery is not only necessary for perishable goods such as food [1], it is also commonly adapted in service-level agreements to guarantee delivery delay. Moreover, transportation tasks on online platforms (e.g., Uber Freight) are often associated with pickup/delivery time requirements, from which an end-to-end delivery deadline can be computed. Meanwhile, very often, considering deadline constraints can turn an easy problem, e.g., finding the fastest path between the origin and a destination, into an NP-hard counterpart [14].

Positive battery SoC constraints. Range anxiety is a common issue for e-trucks due to their limited capacity. Careful planning to prevent battery depletion for an e-truck is thus necessary during the transportation task. However, this requirement adds strong couplings to the traveling decisions between successive road segments, thus largely complicating the problem.

Non-convex carbon footprint objective. We consider an e-truck incurs the carbon footprint objective during intermediary charging. End-use electricity often has a mix of different sources (e.g., coal, natural gas, petroleum, and renewable). Different sources have different carbon intensities (i.e. carbon footprint per unit electricity, unit: kg/kWh); see Table 1 for examples. Among those sources, renewable have notable zero carbon intensity and thus is an eco-friendly type of source. Meanwhile, renewable generation has a large variation in time and locations, resulting in spatial-temporal diversity of carbon intensity of electricity; see FIG. 1 for an illustration. The diverse carbon intensity, along with the nonlinear charging characteristics of the battery, makes the carbon footprint objective non-convex and challenging to deal with.

TABLE 1

U.S electricity generation and resulting $CO_2$ emissions by major type of source in 2020 [39, Tab. 7.2a, Tab. 11.6]

| | Coal | Natural gas | Petroleum | Renewable |
|---|---|---|---|---|
| Carbon Intensity (kg/kWh) | 1.02 | 0.39 | 0.91 | 0 |
| Total emission (tons) | $7.86 \times 10^8$ | $6.35 \times 10^8$ | $1.6 \times 10^7$ | 0 |
| Electricity (kWh) | $7.73 \times 10^{11}$ | $1.62 \times 10^{12}$ | $1.75 \times 10^{10}$ | $7.92 \times 10^{11}$ |

US 12,601,603 B2

3

Enormous geographical and temporal charging options. Due to the fluctuating nature of the renewable, carbon intensity varies largely in both location and time. Jointly with path planning and speed planning, charging planning determines where and when to charge, how much to charge with diverse carbon intensity in different locations and time. The design space is combinatorial in nature, with enormous options to consider, making the CFO problem uniquely challenging to solve.

Indeed, the CFO problem is more complicated and challenging than those in related studies for ICE truck and EV driving optimization and existing approaches are not directly applicable. Previous works related to the present disclosure are reviewed as follows.

E2T2. E2T2 aims to find a path and its associated speed profile from an origin to a destination with minimum energy consumption, while satisfying a hard deadline [14], [29], [41]. It generalizes the NP-hard RSP problem [24], [31], [28] by introducing an additional design space of speed planning. E2T2 problem is first proposed in [14] and also shown to be NP-hard. E2T2 is then generalized to the scenario with multiple pickup/delivery locations with time windows in [29]. Another extension of E2T2 has been studied in [41], where the driver can strategically wait at the rest area for better traffic condition. However, all these studies for E2T2 are for conventional ICE trucks. In this work, the problem for electric trucks with a new objective of minimizing the carbon footprint is studied, imposing unique challenges to the problem due to the coupling nature of the SoC constraints. See Table 2 for a comparison of our work with related studies.

4 not applicable to the CFO problem or incur a high degree of time complexity in the CFO problem; see also Table 3 and Section A.3 for a comparison of conceivable approaches.

Variants of VRP. VRP generalizes the NP-hard traveling salesman problem, where the operator has a fleet of vehicles to fulfill the requirement of a set of customers. The variants of VRP for EV are considered in EVRP [35], [20], [15], [33]. Some other variants of VRP consider the environmental impacts of the routing decisions. For example, the green vehicle routing problem [16] considers VRP for alternative fuel vehicles. The pollution routing problem [6] considers minimizing the emission for conventional vehicles. The electric arc routing problem [18] considers minimizing the total travel time on an energy-indexed graph. As a general observation, variants of VRP only consider path planning and are very complex. The existing methods for VRP do not scale to large-scale network.

There is a need in the art for an improved planning technique for routing a heavy-duty e-truck from an origin to an intended destination with consideration of CFO, where the improved technique overcomes at least some of the above-mentioned problems experienced by existing planning techniques.

SUMMARY

In the present disclosure, a novel stage-expanded formulation for the CFO problem is provided. Compared to alternative approaches in problem formulation, our formulation incurs low model complexity and reveals a problem structure useful for algorithm design for the CFO problem.

TABLE 2

Model comparison between this work and the existing work for truck operations.

| | Speed Planning | Path Planning | Deadline Constraint | Charging Planning | Truck Type | Objective |
|---|---|---|---|---|---|---|
| RSP [24], [31], [28] | No | Yes | Yes | N/A | ICE | Path cost |
| E2T2 [14], [29], [41], [43] | Yes | Yes | Yes | N/A | ICE | Energy / Emission |
| many, e.g., [25] | Yes | No | No | N/A | ICE | Energy |
| many, e.g., [37] | Yes | Yes | No | Yes | Electric / Hybrid | Time / Energy |
| many, e.g., [42] | Yes | No | Yes | No | Electric | Energy |
| This work | Yes | Yes | Yes | Yes | Electric | Carbon footprint |

EV. The EV has long been an active research area. Path planning for EVs involves negative edge weights due to the regenerative system. Many variants of the RSP problem have been proposed for EVs by minimizing the energy consumption subject to a deadline [36], [30], [12], or by finding the fastest path subject to the battery capacity limit [40], [2]. However, all these works only focus on path planning and ignore the design space of speed planning. More recent works consider both path planning and speed planning [4], [3], [19], [23], [37]. For example, Baum et al. [4] seeks to find the fastest path with capacity limit by optimizing both path planning and speed planning for EVs without charging stops by the tradeoff function propagating technique. Strehler et al. [37] give theoretical insights to the path and speed planning problem for EVs and provide a fully polynomial time-approximation scheme for the problem. Overall, all mentioned work and their approaches either are The present disclosure also provides an efficient dual-based algorithm for solving the CFO problem modeled with the stage-expanded formulation. The algorithm enjoys a favorable performance guarantee. In particular, (1) each iteration only incurs polynomial-time complexity, although it requires solving an integer charging planning problem optimally, and (2) the algorithm generates optimal results if a condition is met, and solutions with bounded optimality losses otherwise.

A first aspect of the present disclosure is to provide a first method for co-determining a route plan, a speed plan and an intermediary charging plan for an electric vehicle to travel in a trip from an origin to a destination across a highway network under a hard deadline constraint and one or more SoC constraints. The first method is a computer-implemented method. The electric vehicle may be an e-truck, a heavy-duty e-truck, or any other type of electric vehicle.

In the first method, a stage-expanded graph is constructed to model possible routing decisions of routing the trip in the highway network and possible charging decisions of charging the electric vehicle during the trip. The stage-expanded graph embeds information of arrival time and arrival SoC to thereby facilitate modeling the charging decisions. After the stage-expanded graph is obtained, the route plan, speed plan and intermediary charging plan are optimized according to the stage-expanded graph under an objective of minimizing a carbon footprint incurred in the trip while satisfying the hard deadline constraint and the one or more SoC constraints.

In certain embodiments, constructing the stage-expanded graph comprises the following steps. First, a transportation graph for modeling the possible routing decisions is prepared. The transportation graph includes a plurality of nodes. An individual node is associated with an arriving event of arriving at a corresponding road segment or corresponding charging station in the highway network. Second, a first number of copies of the plurality of nodes is created for the stage-expanded graph. An individual copy of the plurality of nodes is associated with a second number and represents a plurality of respective arriving events occurred at a charging stage that the electric vehicle has been charged for the second number of times during the trip. Third, the stage-expanded graph is formed with the created first number of copies of the plurality of nodes.

In certain embodiments, the first number is given by Y+1 and the second number is selected from 0 to Y, where Y is a maximum allowable number of times of charging the electric vehicle during the trip.

In certain embodiments, the one or more SoC constraints consist of Y SoC constraints. An i-th SoC constraint, where i is between 1 and Y, is that the electric vehicle does not run out of battery when the electric vehicle arrives at a charging station to be used for charging the electric vehicle for the i-th time.

Preferably and advantageously, the route plan, speed plan and intermediary charging plan as optimized are determined by a dual subgradient method.

A second aspect of the present disclosure is to provide a second method for navigating an electric vehicle during a trip from an origin to a destination across a highway network and advising battery charging during the trip under a hard deadline constraint and one or more SoC constraints, where the second method is developed based on the first method disclosed above. The electric vehicle may be an e-truck, a heavy-duty e-truck, or any other type of electric vehicle.

In the second method, a route plan, a speed plan and an intermediary charging plan are co-determined for the electric vehicle to travel in a trip from the origin to the destination across the highway network under the hard deadline constraint and the one or more SoC constraints according to any of the embodiments of the first method. Navigation instructions and charging advices are then provided to the electric vehicle during the trip according to the route plan, speed plan and intermediary charging plan.

Other aspects of the present disclosure are disclosed as illustrated by the embodiments hereinafter.

BRIEF DESCRIPTION OF THE DRAWINGS

FIG. 8 depicts a flowchart of steps used for constructing the stage-expanded graph in the first method under a two-stage approach.

Figure 1:
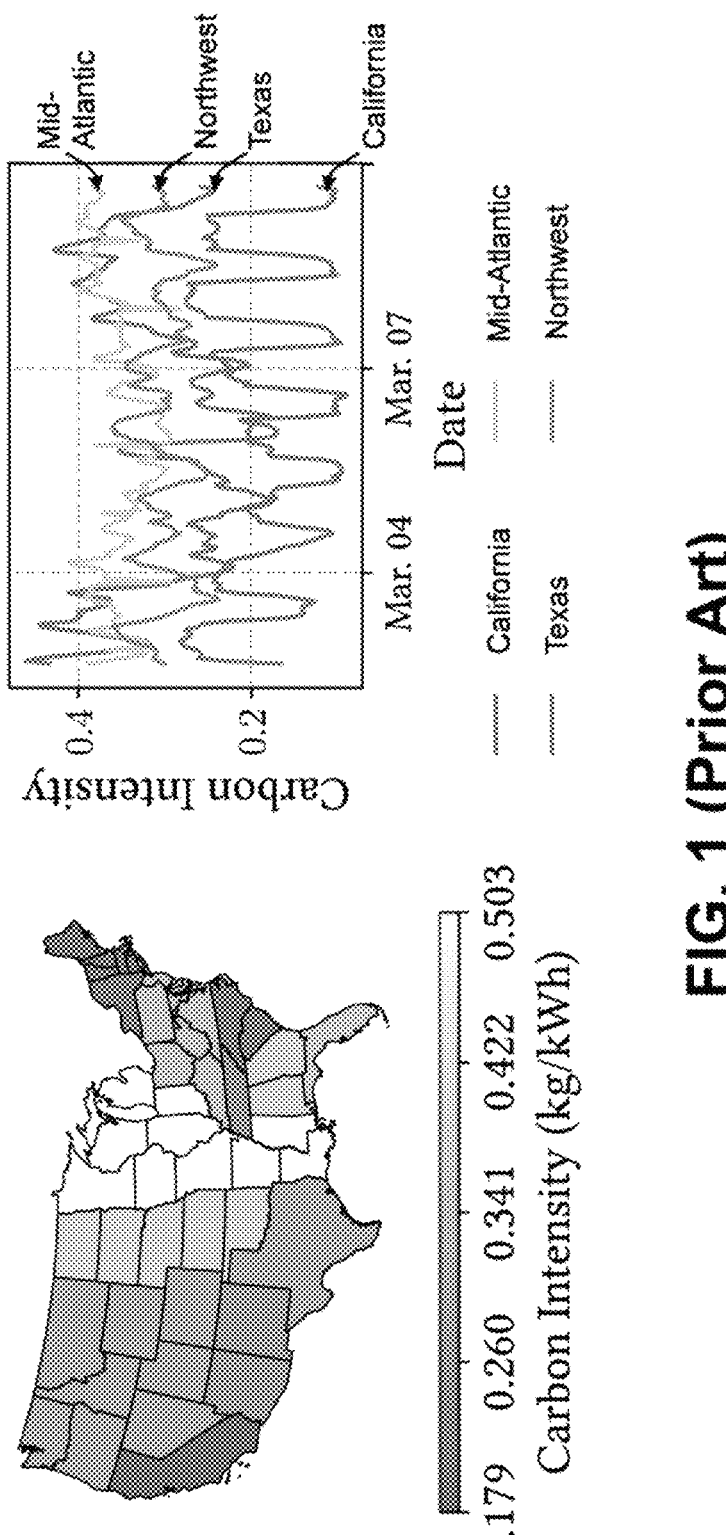
FIG. 1 illustrates spatial-temporal diversity of the carbon intensity (kg/kWh) in the US.

Skilled artisans will appreciate that elements in the figures are illustrated for simplicity and clarity and have not necessarily been depicted to scale.

DETAILED DESCRIPTION

In the present disclosure, we carry out a comprehensive study of the problem and make the following contribution.

We conduct the first study on CFO. We show that the problem is NP-hard. We then show that under practical settings, the CFO problem is equivalent to finding a generalized RSP on a stage-expanded graph, which extends the original transportation graph to incorporate charging options. Compared to alternative approaches, our formulation incurs low model complexity and reveals a problem structure useful for algorithm design.

We then utilize the structured insights from the formulation to develop an efficient dual-subgradient algorithm that always converges. We show that in our approach, each iteration only incurs polynomial-time complexity in graph size, albeit it requires solving an integer charging planning problem optimally. We then further derive a condition under which our algorithm produces an optimal solution and a posterior performance bound when the condition is not satisfied.

We carry out extensive numerical experiments using real-world traces over the US highway network to show the effectiveness of our approach in practice. The results show that our scheme reduces up to 28% carbon footprint as compared to a fastest-path alternative. We conduct a comparison between e-trucks and ICE trucks on their environmental impact. The results show that an e-truck achieves 56% carbon reduction compared to its ICE counterpart.

A. Problem Formulation

A.1. System Model

Transportation Graph and Energy Consumption. We model the highway system as a directed graph $\mathcal{G} = (\mathcal{V}, \varepsilon)$ where $\mathcal{V} = \mathcal{V}_r \cup \mathcal{V}_c$ is the set of nodes. Here $\mathcal{V}_r$ denotes the nodes for real road segments and $\mathcal{V}_c$ denotes the nodes for the charging stations. We denote $\varepsilon \subset \mathcal{V} \times \mathcal{V}$ the set of edges. For each road segment $e \in \varepsilon$, we denote its length by $D_e$ and its minimum (resp. maximum) speed limit by $$R_e^{lb}(\text{resp. } R_e^{ub}).$$

We define the minimum and maximum traveling time limit as $$t_e^{lb} = D_e / R_e^{ub} \text{ and } t_e^{ub} = D_e / R_e^{lb}.$$

Without loss of generality, we assume homogeneous road condition on a road segment $e \in \varepsilon$, e.g., the road grade. Given the weight of an e-truck and the road grade, we model its energy consumption rate over a road segment $e \in \varepsilon$ as a convex function of the traveling speed as justified in [14]: $f_e(r_e)$:

$$[R_e^{lb}, R_e^{ub}] \to \mathbb{R}$$

(unit: kilowatts), where $r_e$ is the traveling speed. Note that for e-trucks, $f_e$ can take negative values over (downhill) road segments because of regenerative breaking [2]. Because of the convexity of $f_e(\cdot)$, it suffices to assume that the e-truck travels on the road segment at constant speed [14, Lem. 1] with no optimality loss. (We ignore the acceleration/deceleration stage between road segments, as it usually occupies a small fraction of time/energy compared with that under the entire road segment.) We further define an energy consumption function for an e-truck to traverse the road segment $e$ as $c_e(t_e)=t_e \cdot f_e(D_e/t_e)$. We note that $c_e(\cdot)$ is a perspective function of $f_e(\cdot)$ with linear transformation. As such $c_e(t_e)$ must be convex in $t_e$ [9].

E-Truck Charging. For each charging station node $v \in V_c$, an e-truck can make two decisions: wait for $$t_w \in [t_w^{lb}, t_w^{ub}]$$

amount of time for lower carbon intensity and charge for $$t_c \in [0, t_c^{ub}]$$

amount of time. Here we use $$t_w^{lb}$$

to denote the time overhead for an e-truck driver to stop and pay bills, etc. We denote the charging function at $v \in \mathcal{V}_c$ by a concave function $\Phi_v(t)$, which represents the charged SoC from zero after we charge for $t$ amount of time. (Most e-trucks use lithium-ion batteries, which are often charged with the constant-current constant-voltage scheme [34]. In the scheme, a battery is first charged by a constant current, and the SoC increases linearly until ~80% of the capacity. After that, a constant voltage is held to avoid overcharging degradation, causing the current to decrease and the SoC to increase concavely.) Given an initial SoC $\beta_v$ we can compute the increment of SoC after a charging time $t_c$ as $$\phi_v(t_c, \beta_v) = \Phi_v(\Phi_v^{-1}(\beta_v) + t_c) - \beta_v. \tag{1}$$

Figure 2:
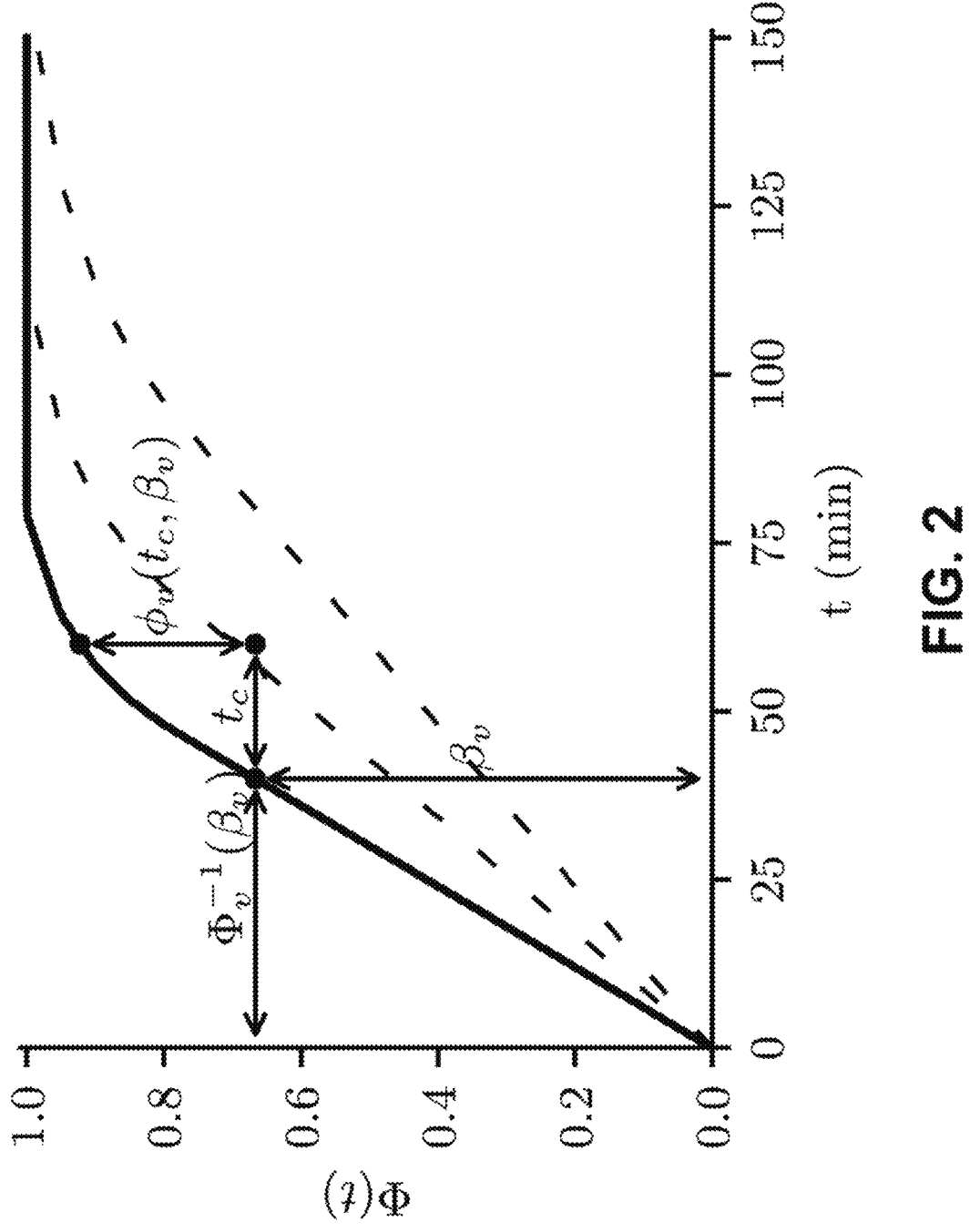
FIG. 2 shows, for illustration purposes, an example of a charging function, and the corresponding SoC difference function.

Here, $$\Phi_v^{-1}$$

is the inverse function of $\Phi_v$; see FIG. 2 for an illustration. FIG. 2 shows an example of charging function $\Phi$, and the corresponding SoC difference function $\phi$. The initial SoC is $\beta_v = 0.67$. After charging for 20 minutes, the increment of SoC $\phi(t_c, \beta_i) = 0.25$. The two dashed lines represent charging functions for different charging schemes.

There could be multiple charging modes for e-trucks, e.g., fast charge and regular charge, which correspond to different charging functions (c.f. FIG. 2). Here, for simplicity, we assume the e-truck only applies the fast charging scheme at each charging station. We note that our approach can be easily extended to take multiple charging schemes into account. For example, we can model different charging schemes at a charging station by adding multiple charging nodes $i \in \mathcal{V}_c$ at the same location.

Carbon Intensity and Carbon Footprint. For each charging station $v \in \mathcal{V}_c$, we define a continuous carbon intensity function $\pi_v(\tau)$ (unit: kg/kWh) where $\tau$ is the arrival time instant at node $v$. We assume $\tau_0 = 0$ at the origin $s$ for ease of the presentation. FIG. 1 illustrates spatial-temporal diversity of the carbon intensity (kg/kWh) in the US. The whole country is divided into 13 regions, and each region includes one or multiple states. Carbon intensity is only provided for individual regions, thus one uniform color for all the states in a region. As illustrated in FIG. 1, the carbon intensity function $\pi_v(\cdot)$ largely varies in locations and time due to the geographical and temporal variation of the renewable generation. We note that the carbon-intensity information can be well forecasted at the hourly scale [32]. Given the carbon intensity function $\pi_v(\cdot)$, if the e-truck with initial SoC $\beta_v$ starts charging at $\tau_v$ at station $v$ and charges $t_c$ time, the induced carbon footprint is $$F_v(\beta_V, t_c, \tau_v) = \frac{1}{\eta} \int_0^{t_c} \pi_v(\tau_v + \xi) \frac{\partial_- \phi_v}{\partial t}(\xi, \beta_v) d\xi \tag{2}$$

Here, $0 < \eta \leq 1$ is the charging efficiency of the battery.

$$\frac{\partial_- \phi_v}{\partial t}(\xi, \beta)$$

is the left partial derivative with respect to $t$, which denotes the charging rate given the charging time $\xi$ and initial SoC $\beta$. For charging at station $v \in \mathcal{V}_c$, the carbon footprint depends on the initial SoC $\beta_v$, the charging time $t_c$ and the arrival time $\tau_v$. It is the integral of the product of the price function and charging rate and thus nonlinear and non-convex.

A.2. CFO Problem

We study the problem of minimizing the carbon footprint of an e-truck traveling from the origin $s \in \mathcal{V}$ to the destination $d \in \mathcal{V}$, subject to the hard deadline T and the SoC constraints. We consider that the e-truck with initial SoC $\beta_0$ and battery capacity B can take at most N charging stops during the trip. We assume that N is a given parameter to our problem. In practice, it is reasonable to limit the number of charging stops in a trip for a good experience. The number is usually small, e.g., 3 or 4 for a 1500-mile e-truck transportation. In our simulation, we set the number of charging stops to be no more than eight.

A Stage-Expanded Graph. One of the challenges for formulating the CFO problem is the lack of the arrival time information and the arrival SoC information in the original transportation graph g. Such information is essential for objective evaluation in the charging planning. To incorporate such information and mitigate this challenge, we consider a stage-expanded graph, which extends the original transportation graph to model the charging decisions.

In particular, we consider a stage-expanded graph $\mathcal{G} = (\mathcal{V}_s, \mathcal{E}_s)$ with N+1 stages. Here $\mathcal{V}_s$ contains N+1 copies of original node, i.e. $\mathcal{V}_s = \{v^i : v \in \mathcal{V}, i \in \{1, \ldots, N+1\}\}$. The edge set $\mathcal{E}_s$ keeps the original edges with additional connection between the same charging stations and destinations for two adjacent stages. That is, $$\mathcal{E}_S = \{(u^i, v^i) : (u, v) \in \mathcal{E}, \ i \in \{1, \ldots, N+1\}\} \cup$$

$$\{(v^i, v^{i+1}) : v \in \mathcal{V}_c \cup \{d\}, i \in \{1, \ldots, N\}\}.$$

Figure 3:
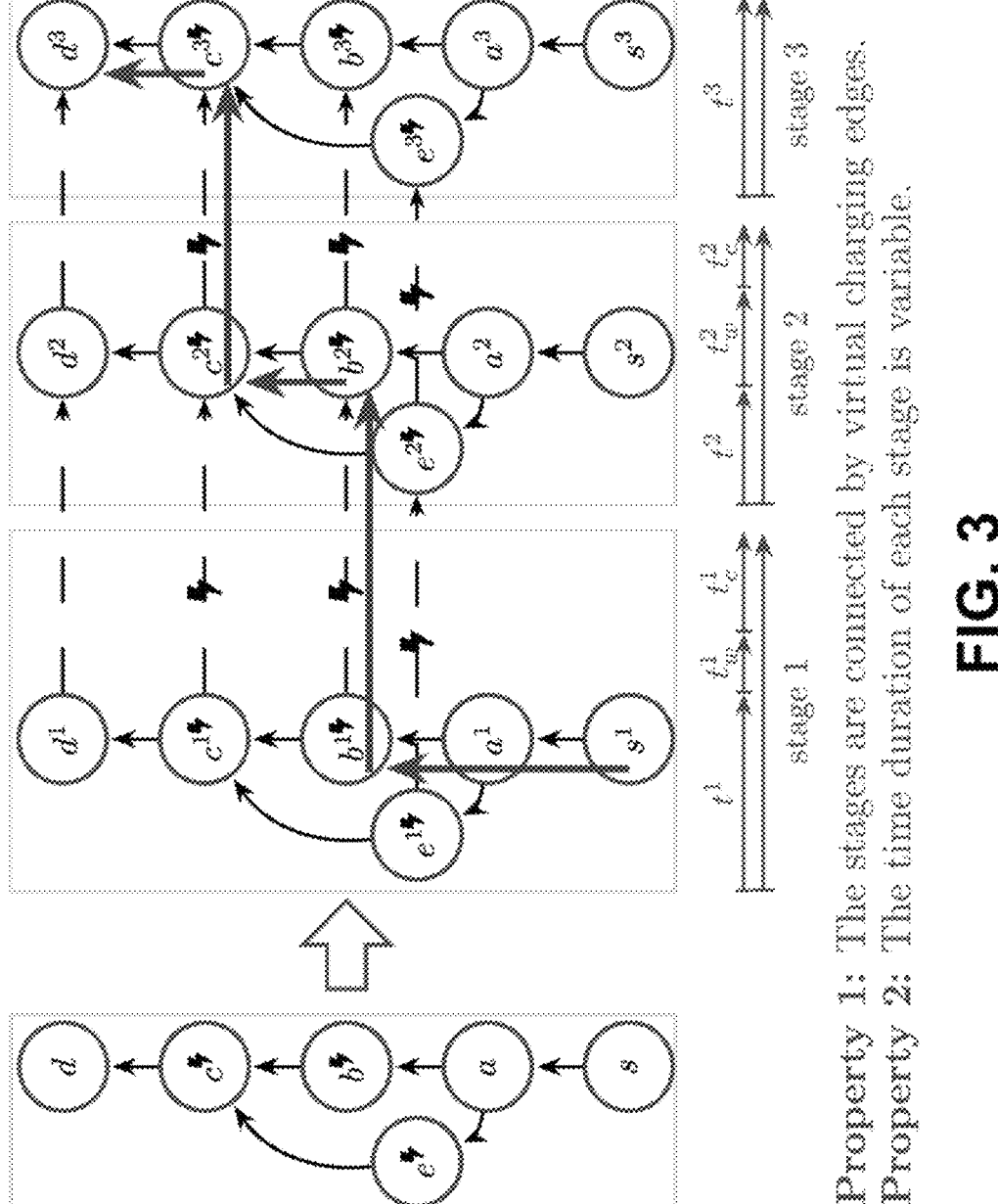
FIG. 3 depicts, for illustration purposes, an example of a stage-expanded graph with two charging stops.

When an e-truck at stage i decides to charge at a charging station $v \in \mathcal{V}_c$, we model it travels through a virtual stage transition edge $(v^i, v^{i+1})$. At each stage, the e-truck travels towards the next charging station (or the destination), then wait and charge at the charging station and enter the next stage or stop at the destination. Note that the e-truck can charge less than N times, arrive the destination at stage i<N+1 and then travel across stages through virtual edges between destinations and arrive the final stage. We provide an illustration in FIG. 3. FIG. 3 depicts an example of the stage-expanded graph with N=2 charging stops. Here, nodes b, c, e are charging stations in the original transportation graph.

As we shall see in the following, the stage-expanded graph naturally incorporates the information of the arrival time and the arrival SoC, making it easier to model the charging decisions. We shall also discuss the benefits of such a stage-expanded graph and compare its conceivable alternatives later in Section A.3 after we formulate the CFO problem.

Path and Charging Station Selection. A path in the stage-expanded graph consists of N+1 subpaths connecting the source, no more than N charging stations and the destination. We use binary variables to represent the choice of charging stops at each stage and road segments in each subpath.

In particular, for each charging station $v \in \mathcal{V}_c$, we define a binary charging station selection variable $$y_v^i \in \{0, 1\} \text{ and } y_v^i = 1$$

means we want to choose charging station v as our i-th charging stop. For each subpath $i \in \{1, \ldots, N+1\}$ and road segment $e \in \mathcal{E}$, we define a binary path selection variable $$x_e^i \in \{0, 1\} \text{ and } x_e^i = 1$$

means we want to travel through road segment e for i-th subpath. For ease of presentation, we stack the variables $$\vec{x}^i = \{x_e^i\}_{e \in \mathcal{E}}, \vec{x} = \{\vec{x}^i\}_{i=1}^{N+1} \text{ and } \vec{y}^i = \{y_e^i\}_{e \in \mathcal{E}}, \vec{y} = \{\vec{y}^i\}_{i=1}^{N+1}.$$

We define the feasible set of $(\vec{x}, \vec{y})$ as follows:

$$\mathcal{P} = \{(\vec{x}, \vec{y}) | x_e^i \in \{0, 1\}, \forall e \in \mathcal{E}, i \in \{1, \ldots, N+1\} \quad (3a)$$

$$y_v^i \in \{0, 1\}, \forall v \in \mathcal{V}, i \in \{0, \ldots, N+1\} \quad (3b)$$

$$\sum_{e \in Out(v)} x_e^i - \sum_{e \in In(v)} x_e^i = y_v^{i-1} - y_v^i, \forall v \in \mathcal{V}, i \in \{1, \ldots, N+1\} \quad (3c)$$

$$\sum_{v \in \mathcal{V}} y_v^i = 1, \sum_{v \in \mathcal{V}} y_v^i = 1, \forall i \in \{0, 1, \ldots, N+1\} \quad (3d)$$

$$y_s^0 = 1, y_d^{N+1} = 1\}. \quad (3e)$$

Here, $\vec{\mathcal{V}}_c = \mathcal{V}_c \cup \{s, d\}$. Out (v) and In(v) are the sets of outgoing and incoming edges of node v, respectively. Constraint (3c) is the flow conservation requirement for each subpath. Constraint (3d) ensures that only one charging station is selected for each stage. Constraint (3e) defines that boundary case at the origin s and the destination d. We remark that P also covers path with charging stops less than N as we can choose the same charging stops at adjacent stages.

Speed and Charging Planning. We then define the decision variables for speed planning and charging planning. For each subpath i and road segment e, we denote the traveling time as $$t_e^i.$$

We also denote by $$t_w^{i,v}, t_c^{i,v}$$

the waiting and charging time for charging station v as i-th charging stop. We also stack the variables as $$\vec{t}^i = \{t_e^i\}_{e \in \mathcal{E}}, \vec{t}_w^i = \{t_w^{i,v}\}_{v \in \mathcal{V}_c}, \vec{t}_c^i = \{t_c^{i,v}\}_{v \in \mathcal{V}_c}, \vec{t} = \{(\vec{t}^i, \vec{t}_w^i, \vec{t}_c^i)\}_{i=0}^{N+1}.$$

The corresponding feasible set is given by $$\mathcal{T} = \left\{ \vec{t} \,\middle|\, t_e^i \in \left[t_e^{lb}, t_e^{ub}\right], \forall e \in \mathcal{E}, i \in \{1, \dots, N+1\} \right\} \tag{4a}$$

$$t_w^{i,v} \in \left[t_w^{lb}, t_w^{ub}\right], t_c^{i,v} \in \left[0, t_c^{ub}\right], \forall v \in \tilde{\mathcal{V}}_c, i \in \{1, \dots, N\} \tag{4b}$$

$$t_w^0 = t_c^0 = 0 \bigr\}. \tag{4c}$$

Time Constraints. We denote $$\tau_v^i$$

as the moment of an e-truck entering the charging station $v$ at i-th stop. It enables us to allocate the total allowed travel time T to the subpath at each stage. We also stack the variable as $$\vec{\tau} = \left\{ \tau_v^i \right\}_{v \in \tilde{\mathcal{V}}_c, i \in \{0, \dots N+1\}}$$

and its feasible set is given by $$\mathcal{T}_\tau = \left\{ \vec{\tau} \,\middle|\, \tau_v^i \in [0, T], \forall v \in \tilde{\mathcal{V}}_c, i \in \{0, \dots, N+1\} \right\}. \tag{5}$$

We consider the constraint that the traveling time and charging time are within the scheduled time window for i-th subpath, $i \in \{1, \dots, N+1\}$:

$$\delta_i^\tau(\vec{x}, \vec{y}, \vec{t}, \vec{\tau}) = \tag{6}$$

$$\sum_{e \in \mathcal{E}} x_e^i t_e^i + \sum_{v \in \tilde{\mathcal{V}}_c} y_v^{i-1}\left(t_w^{i-1,v} + t_c^{i-1,v}\right) - \sum_{v \in \tilde{\mathcal{V}}_c}\left(y_v^i \tau_v^i - y_v^{i-1} \tau_v^{i-1}\right) \le 0.$$

Here, the first two terms are the traveling time on i-th subpath and the spent time for (i−1)-th stop. The third term is the total scheduled time duration between (i−1)-th stop and i-th stop.

SoC Constraints. It is complicated to keep track of the SoC at each road segment. In practice, we see that the regenerative braking only contributes a small fraction of energy to the e-truck [38]. With such a practical observation, we show that with a small reservation requirement at the SoC when entering a charging stop at a stage, it is sufficient to guarantee the positive SoC in the entire subpath at that stage.

In particular, we denote by $$\beta_v^i$$

the SoC entering charging station $v$ at i-th stop. We stack the variable as $$\vec{\beta} = \left\{ \beta_v^i \right\}_{v \in \tilde{\mathcal{V}}_c, i \in \{0, \dots N+1\}},$$

and its feasible set is given by $$\mathcal{S}_\alpha = \left\{ \vec{\beta} \,\middle|\, \beta_v^i \in [\alpha B, B], \forall v \in \tilde{\mathcal{V}}_c, i \in \{0, \dots, N+1\}, \beta_s^0 = \beta_0 \right\}. \tag{7}$$

Here, $\alpha \in [0,1)$ denotes the ratio of a conservative lower bound for SoC when an e-truck entering a charging station. We consider the initial SoC at the source as $\beta_0$.

We define the SoC constraint that the e-truck does not run out of battery when entering i-th stop;

$$\delta_i^\beta(\vec{x}, \vec{y}, \vec{t}, \vec{\beta}) = \tag{8}$$

$$\sum_{e \in \mathcal{E}} x_e^i c_e^i(t_e^i) + \sum_{v \in \tilde{\mathcal{V}}_c} y_v^i \beta_v^i - \sum_{v \in \tilde{\mathcal{V}}_c} y_v^{i-1}\left(\beta_v^{i-1} + \phi_v\left(\beta_v^{i-1}, t_c^{i-1,v}\right)\right) \le 0.$$

Here, the first term is the total energy consumption for i-th subpath, the second term is the SoC when the e-truck enters the i-th stop, the third term is the SoC when the e-truck leaves the (i−1)-th stop.

We show that a small a is sufficient to ensure SoC feasibility during a subpath, as along as the harvested energy due to regenerative brake is relatively small.

Lemma 1. Let an e-truck travels along a subpath with n road segments to a charging stop, along with its energy consumption on each road segment $[c_1, \dots, c_n]$. If the harvested energy is relatively small and satisfies $$\frac{1}{2}\sum_{i=1}^{n}(|c_i| - c_i) \le \frac{\alpha}{2(1-\alpha)}\sum_{i=1}^{n}c_i, \tag{9}$$

then the SoC at the charging stop being no less than $\alpha \cdot B$ implies that the e-truck always has a nonnegative SoC during this subpath.

Note that the harvested energy (i.e. left hand side of (9)) for an e-truck traveling across national highway system is indeed small [38]. Since the maximum permissible grade along the US highway is no larger than 6% [22], there is little energy that can be harvested. Meanwhile, our simulation in Section C shows that $\alpha=0.05$ is sufficient to ensure non-negative SoC for most of the instances in our simulation. Moreover, it also shows that it incurs a small performance gap by comparing it with a lower bound where a is set as zero.

Problem Formulation. To this end, we are ready to formulate the CFO problem as follows:

$$CFO: \min \sum_{i=1}^{N} \sum_{v \in V_c} y_v^i F_v\left(t_c^{i,v}, t_w^{i,v}, \beta_v^i, \tau_v^i\right) \tag{10a}$$

$$\text{s.t. } \delta_i^\tau(\vec{x}, \vec{y}, \vec{t}, \vec{\tau}) \le 0, \forall i \in \{1, \dots, N+1\} \tag{10b}$$

$$\delta_i^\beta(\vec{x}, \vec{y}, \vec{t}, \vec{\beta}) \le 0, \forall i \in \{1, \dots, N+1\} \tag{10c}$$

$$\text{var. } (\vec{x}, \vec{y}) \in \mathcal{P}, \vec{\beta} \in \mathcal{S}_\alpha, \vec{\tau} \in \mathcal{T}_\tau, \vec{t} \in \mathcal{T}. \tag{10d}$$

Here, we aim to minimize the carbon footprint objective (10a). Constraint (10b) is the time scheduling constraint for each subpath. Constraints (10c) is the SoC constraints for each subpath.

We give the hardness result of the problem in the following theorem.

Theorem 1. CFO is NP-hard.

The NP-hardness of the CFO problem comes from the fact that a special case of the CFO problem is PASO problem [14] that considers the path planning and speed planning for energy-efficient timely transportation with ICE trucks.

TABLE 3

Comparison of conceivable problem modelings, formulations, and algorithms for the CFO problem.

| Case | Graph model in formulation | Problem | Model complexity | Algorithm | Complexity | Optimality |
|------|----------------------------|---------|------------------|-----------|------------|------------|
| I | Original graph | MIP | $O(|\mathcal{V}| + |\mathcal{E}|)$ | Branch and bound | Exponential to $|\mathcal{V}|$ and $|\mathcal{E}|$ | Optimal |
| II | Battery-expanded graph | MILP (Note 1) | $O\left(\dfrac{B}{\epsilon(|\mathcal{V}|+|\mathcal{E}|)}\right)$ | Branch and cut | Exponential to $|\mathcal{V}|, |\mathcal{E}|$ and $B/\epsilon$ | $O(\epsilon)$ to optimal |
| III | Time-expanded and battery-expanded graph | Shortest Path | $\left(\dfrac{T\cdot B}{\epsilon^2}(|\mathcal{V}|+|\mathcal{E}|)\right)$ | Bellman-Ford | Polynomial to $|\mathcal{V}|, |\mathcal{E}|, T/\epsilon$ and $B/\epsilon$ | $O(\epsilon)$ to optimal |
| IV | Our stage-expanded graph | Generalized RSP | $O(N(|\mathcal{V}| + |\mathcal{E}|))$ | Dual subgradient | Exponential to $|\mathcal{V}|, |\mathcal{E}|$ and N | Posterior bound |

Note 1:
Provided that the carbon intensity function is approximated by a piecewise linear function.

A.3. Remark on Challenges and Novelty

We first remark on four outstanding challenges of the CFO problem, after which we discuss the novelty of our formulation and its significance for tackling those challenges.

Remark on Challenges. The first challenge comes from optimal path planning and speed planning under the hard deadline constraint, which already makes the problem NP-hard. This challenge exists in both the CFO problem and the E2T2 problem for ICE trucks, e.g., [14]. The following three challenges are unique to e-truck and CFO.

The second challenge is the positive battery SoC requirement for each road segment, which adds strong couplings to the problem. One of the conventional ways is to explicitly define variables and constraints on each road segment (c.f., EVRP [33]) and obtain a large MIP. However, the resulting MIP is still challenging to solve because general-purpose methods usually do not scale well on MIP. We mitigate this challenge in our formulation with a key observation (Lemma 1) that it is sufficient to restrict the SoC only when entering each charging stop (and the destination) by a conservative lower bound, i.e. (8). As reported in Section C, such simplification only incurs a small performance loss.

The third challenge comes from the non-convex objective, which is unique to the CFO problem. The objective is time-varying and highly non-convex with respect to r due to the fluctuating nature of renewable. Large-scale non-convex problems are in general challenging to solve. Our problem formulation reveals an elegant problem structure that allows us to decompose the large non-convex problem into a number of significantly less-complex subproblems, which can be efficiently solved by global optimization tools, as we will show in Section B.

The last challenge comes from enormous geographical and temporal charging options with diverse carbon intensity. The charging station selection configuration space has a combinatorial nature. A straightforward search over locations results in an exponential runtime with respect to N. To tackle this challenge, our formulation extends the transportation graph to a stage-expanded graph to model charging options. This extension significantly reduces the searching space to a polynomial number and allows us to systematically search charging stations with constraint-respect costs via Lagrangian relaxation.

Remark on Novelty. Overall, those four challenges make the CFO problem notoriously challenging to solve. In the following, we remark the novelty of our approach by comparing our approach with several conceivable alternatives that are applicable to the CFO problem. We summarize the comparison in Table 3. Comparing our stage-expanded graph (Case IV) with battery-expanded graphs (Cases II and III) shows that our stage-expanded graph has a low model complexity because the number of stages N is at most 10 in practice. Comparing our stage-expanded graph (Case IV) with MIP formulations (Cases I and II) indicates that our formulation reveals an elegant problem structure that leads to an efficient algorithm with favorable performance.

The first direction of alternatives (c.f., the first row and the second row in Table 3) resorts to directly formulate the CFO problem as a MIP and solve it with general-purpose methods (e.g., branch and bound). However, the resulting MIP is still challenging to solve. The general-purpose methods usually do not scale well to large problems as they do not carefully explore the problem structure. The second direction of alternative expands the graph with discretized state $\beta$ and $\tau$ (c.f. the third row in Table 3). Once the expanded graph is constructed, the CFO problem can be transformed to a shortest path problem on the expanded graph. However, the graph is $(T\cdot B)/\epsilon^2$ times of the original graph, making the approach fail to scale to large networks with favorable accuracy.

In contrast, our formulation in (10) enjoys the benefits for the both worlds. It has a low-complexity stage-expanded graph model, which does not involve discretizing the time or SoC. Moreover, the formulation reveals an elegant problem structure for effective algorithm design. In the next section, we shall exploit the understanding and design an efficient dual-subgradient method that has good theoretical and empirical performance.

B. An Efficient Algorithm with Performance Guarantee

B.1. The Dual Problem

We obtain a partially-relaxed dual problem of CFO in (10) by relaxing the constraints (10b) and (10c) with dual variable $$\lambda_i^\tau \text{ and } \lambda_i^\beta,$$

respectively. The Lagrangian function is given by $$L\left(\vec{x}, \vec{y}, \vec{t}, \vec{\beta}, \vec{\tau}, \vec{\lambda}\right) =$$

$$\sum_{i=1}^{N}\sum_{v\in V_c} F_v\left(t_c^{i,v}, t_w^{i,v}, \beta_v^i, \tau_v^i\right) + \sum_{i=1}^{N+1}\lambda_i^\tau \delta_i^\tau\left(\vec{x}, \vec{y}, \vec{t}, \vec{\tau}\right) + \sum_{i=1}^{N+1}\lambda_i^\beta \delta_i^\beta\left(\vec{x}, \vec{y}, \vec{t}, \vec{\beta}\right)$$

where $\vec{\lambda}=(\vec{\lambda}^\beta, \vec{\lambda}^\tau)$. The corresponding dual problem is given by $$\max_{\vec{\lambda}\geq 0} D(\vec{\lambda}) = \max_{\vec{\lambda}\geq 0} \min_{\substack{\vec{x},\vec{y},\vec{t},\vec{\beta},\vec{\tau}}} L\left(\vec{x}, \vec{y}, \vec{t}, \vec{\beta}, \vec{\tau}, \vec{\lambda}\right). \tag{11}$$

Given $\vec{\lambda}$, we observe the problem of $D(\vec{\lambda})$ is a two-level problem where the inner level consists of a number of small subproblems and the outer level is a combinatorial problem over the feasible set $\mathcal{P}$. That is, $$D(\vec{\lambda}) = D_1(\vec{\lambda}) + \min_{\vec{x},\vec{y}\in\mathcal{P}} \left(\sum_{i=1}^{N+1}\sum_{e\in\mathcal{E}} x_e^i \underbrace{\min_{t_e^i\in[t_e^{lb}, t_e^{ub}]} g_e^i\left(\vec{\lambda}, t_e^i\right)}_{\text{speed planning}} + \right. \tag{12a}$$

$$\left. \sum_{i=1}^{N}\sum_{v\in V_c} y_v^i \underbrace{\min_{\substack{t_c^{i,v}\in[0,t_c^{ub}], t_w^{i,v}\in[t_w^{lb}, t_w^{u,v}], \\ \beta_v^i\in[\beta^{lb}, B], \tau_v^i\in[0,T]}} h_v^i\left(\vec{\lambda}, t_c^{i,v}, t_w^{i,v}, \beta_v^i, \tau_v^i\right)}_{\text{charging planning}}\right), \tag{12b}$$

where $$D_1(\vec{\lambda}) = -\lambda_{N+1}^\tau T - \beta_0 \lambda_1^\beta$$

is a constant for any given $\vec{\lambda}$ and $$g_e^i\left(\vec{\lambda}, t_e^i\right) = \lambda_i^\tau t_e^i + \lambda_i^\beta c^e\left(t_e^i\right) \tag{13}$$

represents the trade-off between the traveling time $$t_e^i$$

and the energy consumption $$c_e\left(t_e^i\right)$$

for each road segment $e\in\mathcal{E}$. The function $$h_v^i\left(\vec{\lambda}, t_c^{i,v}, t_w^{i,v}, \beta_v^i, \tau_v^i\right) = F_v\left(t_c^{i,v}, t_w^{i,v}, \beta_v^i, \tau_v^i\right) + \lambda_{i+1}^\tau\left(t_w^{i,v} + t_c^{i,v}\right) + \tag{14a}$$

$$\left(\lambda_{i+1}^\tau - \lambda_i^\tau\right)\tau_v^i + \left(\lambda_i^\beta - \lambda_{i+1}^\beta\right)\beta_v^i - \lambda_{i+1}^\beta \phi_v\left(\beta_v^i, t_c^{i,v}\right) \tag{14b}$$

represents the trade-off between the objective and the constraints. Next, we define $$w_e^i(\vec{\lambda}) = \min_{t_e^i\in[t_e^{lb}, t_e^{ub}]} g_e^i\left(\vec{\lambda}, t_e^i\right), \tag{15a}$$

$$\sigma_v^i(\vec{\lambda}) = \min_{\substack{t_c^{i,v}\in[0,t_c^{ub}], t_w^{i,v}\in[t_w^{lb}, t_w^{ub}], \beta_v^i\in[\alpha B, B], \tau_v^i\in[0,T]}} h_v^i\left(\vec{\lambda}, t_c^{i,v}, t_w^{i,v}, \beta_v^i, \tau_v^i\right). \tag{15b}$$

Here, $$w_e^i(\vec{\lambda})$$

can be computed by solving a single-variable convex optimization problem because $$g_e^i\left(\vec{\lambda}, t_e^i\right)$$

is convex with respect to $$t_e^i.$$

The computation of $$\sigma_v^i(\vec{\lambda})$$

requires more effort, where we need to solve a 4-variable non-convex optimization problem over box constraints. Fortunately, the dimension of the subproblem (15b) is fixed. Therefore, we can obtain $\sigma(\vec{\lambda})$ in $$O\left(M^4/\epsilon_1^4\right)$$

with a Branch and Bound scheme [8]. Here $$M = \max\{t_c^{ub}, t_w^{ub}, B, T\}$$

is the diameter of the box constraint in subproblem (15b) and $\epsilon_1$ is the accuracy.

Solving the Outer Level Problem. After solving the inner level subproblems (15a) and (15b), the dual function can be written as follows:

$$D(\vec{\lambda}) = D_1(\vec{\lambda}) + \min_{\vec{x},\vec{y} \in \Omega} \sum_{l=1}^{N+1} \sum_{e \in \varepsilon} w_e^l(\vec{\lambda}) x_e^l + \sum_{l=1}^{N} \sum_{v \in V_c} \sigma_v^l(\vec{\lambda}) y_v^l \qquad (16)$$

The problem in (16), at first glance, is an ILP which is in general challenging to solve. However, after exploring the problem structure, we can see that each charging station v is associated with a cost $$\sigma_v^i$$

if it is the i-th charging stop, and each road segment e is with a cost $$w_e^i$$

if it is in i-th subpath. Our goal is to find N charging stops and N+1 subpaths with the minimum total cost. We observe that given any charging station selection, optimal subpaths can be determined by the shortest paths. Correspondingly, we can construct an extended graph consisting of N layers of charging stations with cost $$\sigma_v^i$$

and edges between any two nodes in the consecutive layers with weight determined by the shortest paths. We can then find the optimal charge stop selection by the shortest path on the extended charging station graph. This idea leads to a novel two-level shortest path algorithm.

In particular, we construct an extended graph $\mathcal{G}_{ex} = (\mathcal{V}_{ex}, \varepsilon_{ex})$, where the node set $\mathcal{V}_{ex}$ contains s, d and N copies of charging stations, i.e.

$$\mathcal{V}_{ex} = \{s, d\} \cup \{v^i \mid v \in \mathcal{V}_c, i \in \{1, \dots, N\}\} \qquad (17)$$

For each u, $v \in \mathcal{V}_c$ and $i \in \{1, \dots, N\}$, we construct an edge between $u^i$ and $v^{i+1}$ with cost $$\sigma_u^i(\vec{\lambda}) + SP^{i+1}(u, v)$$

where $SP^{i+1}(u, v)$ is the cost of shortest path between (u, v) on the original graph G with weight $$w_e^{i+1}(\vec{\lambda}).$$

Similarly, we construct edges (s, $v^1$), $\forall v \in \mathcal{V}_c$ with weights $SP^1(s, v)$ and construct edges ($u^N$, d), $\forall v \in \mathcal{V}_c$ with weights $$\sigma_v^N + SP^{N+1}(u^N, d).$$

By construction, we have the following lemma:

Lemma 2. A shortest path on $G_{ex}$ corresponds to an optimal solution to ILP problem in (16).

Hence, we can solve the ILP problem (16) by applying a shortest path algorithm to the extended graph $G_{ex}$ with low time complexity. Overall, given any $\vec{\lambda}$, we can compute the value of $D(\vec{\lambda})$ by first solving a number of subproblems (15a) and (15b) and then solving the outer problem (16) with shortest algorithms on an extended graph.

| Algorithm 1: A Dual Subgradient Method. |
|---|
| 1. Initialization: sol ← NULL, λ[1] ← 0 |
| 2. for k ← 1 to K do |
| 3.     Compute sol$^+$ with λ[k] by solving problem (12) |
| 4.     if $\delta^\beta$ [k]=0 and $\delta^\tau$ [k]= 0, $\forall i \in \{1, \dots, N + 1\}$ then |
| 5.         return sol ← sol$^+$ |
| 6.     if $\delta^\beta$ [k] ≤ 0 and $\delta^\tau$ [k] ≤ 0, $\forall i \in \{1, \dots, N + 1\}$ and sol+ has less objective then |
| 7.         sol ← sol+ |
| 8.     Compute λ[k + 1] according to (18). |
| 9.    return sol |

B.2. A Dual Subgradient Algorithm

We use the dual subgradient method to iteratively update the dual variable $\vec{\lambda}$. In particular, we denote by $\vec{\lambda}[k]$ the dual variable at k-th iteration. Then we update the dual variable as follows:

$$\lambda_i^\beta[k + 1] = \left(\lambda_i^\beta[k] + \theta_k \frac{\delta_i^\beta(\vec{x} * [k], \vec{y} * [k], \vec{t} * [k], \vec{\beta} * [k])}{\delta_i^\beta[k]}\right)_+ \qquad (18a)$$

$$\lambda_i^\tau[k + 1] = \left(\lambda_i^\tau[k] + \theta_k \frac{\delta_i^\tau(\vec{x} * [k], \vec{y} * [k], \vec{t} * [k], \vec{\tau} * [k])}{\delta_i^\tau[k]}\right)_x \qquad (18b)$$

Here, $\vec{x} *[k]$, $\vec{y} *[k]$, $\vec{t} *[k]$, $\vec{\beta} *[k]$, $\vec{\tau} *[k]$ are the solutions of the computed from the subproblems (16), (15a), and (15b) with $\vec{\lambda}[k]$. The values $$\delta_i^\beta[k] \text{ and } \delta_i^\tau[k]$$

are thus the corresponding subgradients of $D(\vec{\lambda})$ for each components. The notation $(\alpha)_+$ denotes $\max\{0, \alpha\}$. The step size at k-th iteration is denoted as $\theta_k$.

The overall algorithm is summarized in Algorithm 1. From a high-level perspective, the dual variables $\vec{\lambda}$ can be interpreted as the price for the scheduled deadline and SoC. For example, a higher $$\lambda_i^\beta$$

gives more weight on the constraint $$\delta_i^\beta$$

and has multiple effects. First, it gives more weight for the energy cost in (13), thus resulting in a larger traveling time in the edge subproblem 15a. Meanwhile, a higher $$\lambda_i^\beta$$

results in a lower scheduled SoC $$\beta_v^i$$

at i-th stop but a higher $$\beta_v^{i-1}$$

and more charging time $$t_c^{i,v}$$

at (i−1)-th stop. It means that a higher $$\lambda_i^\beta$$

results in a larger difference of scheduled SoC between charging stops (i−1) and i. A similar interpretation applies to the dual variable $$\lambda_i^\tau.$$

Overall, Algorithm 1 seeks to find a solution that balances the objective and the constraint cost and adjusts the dual variable via the subgradient direction.

B.3. Performance Analysis

In this subsection, as one of the key contributions, we show that (i) our algorithm always converges with a rate of $O(1/\sqrt{K})$ where K is the number of iterations, (ii) each iteration only incurs polynomial-time complexity in graph size, and (iii) it generates optimal results if a condition is met and solutions with bounded loss otherwise.

Convergence Rate. Similar to standard subgradient methods [10], algorithm 1 also converges to dual optimal value at a rate of $O(1/\sqrt{K})$.

Theorem 2 Let D* be the optimal dual objective and let $\bar{D}_K$ be the maximum dual value over K iterations in Algorithm 1. With constant step size $$\theta_k = \frac{1}{\sqrt{K}},$$

we have, for some constant C, $$D* - \bar{D}_K \le \frac{C}{\sqrt{K}} \tag{19}$$

It shows that a constant step size $\theta_k=1/\sqrt{K}$ is sufficient to achieve a convergence rate of $O(1/\sqrt{K})$. However, one may achieve better empirical convergence by adaptively updating the step sizes [5]. Besides, another improvement can be achieved by modifying the directions [11].

Time Complexity. We summarize the time complexity analysis of Algorithm 1 in the following Proposition.

Proposition 1. The time complexity per iteration of Algorithm 1 is $$O\left((N+1)|\mathcal{V}_c||\mathcal{V}||\varepsilon| + N|\mathcal{V}_c|\frac{M^4}{\epsilon_1^4}\right), \tag{20}$$

where $$M = \{t_c^{ub}, t_w^{ub}, B, T\}$$

and $\epsilon_1$ is the required accuracy for solving the subproblems (15b).

Proposition 1 states that at each iteration, Algorithm 1 incurs only polynomial time complexity in graph size, albeit it requires solving the ILP subproblem in (15b) optimally. Meanwhile, Theorem 2 guarantees that Algorithm 1 converges to a solution with accuracy $\epsilon_0$ in $$O(1/\epsilon_0^2)$$

iterations. We can derive the total time complexity of Algorithm 1 by combining Proposition 1 and Theorem 2.

Optimality Gap. Note that in the dual subgradient method, a convergence to dual optimal does not imply a convergence to the primal optimal as there might be a duality gap. To this end, we provide the following bound on the optimality gap.

Theorem 3. Let OPT be the optimal objective to the problem in (10). If Algorithm 1 produces a feasible solution updated at iteration k with objective ALG, then the optimality gap is bounded by $$ALG - OPT \le -\sum_{i=1}^{N+1}\left(\lambda_i^\beta[k]\delta_i^\beta[k] + \lambda_i^\tau[k]\delta_i^\tau[k]\right). \tag{21}$$

The posterior bound (21) simply comes from the weak duality. Meanwhile, we can compute it at each iteration in Algorithm 1 and use it for early termination upon certain accuracy. Moreover, Theorem 3 also provides an optimality condition of the produced solution by the following corollary.

Corollary 1. If Algorithm 1 returns a feasible solution in line 5, then the solution is optimal.

Note that Theorem 3 requires Algorithm 1 to produce a feasible solution, which is not guaranteed in dual-based methods. In the case where Algorithm 1 does not find a feasible solution, we $r_e$-optimize the speed planning and charging planning with the given path in the last iteration of Algorithm 1 and try to recover a feasible primal solution. As seen in Section C, this recovery scheme always finds a feasible solution.

C. Numerical Experiments

In this section, we evaluate the performance of our algorithm by simulations using real-world traces over the US highway network. Our objectives are: (i) to study the behavior of the carbon-optimized solutions; (ii) to study the performance of the proposed approach as compared to baselines and the impact of path planning, speed planning, charging planning, respectively; (iii) to study the impact of conservative ratio $\alpha$; (iv) to compare the carbon footprint between electric trucks and ICE trucks; and (v) to study the environmental benefit of e-trucks.

C.1. Experiment Setup

Transportation network. We collect the highway network data from the METAL project. The constructed network consists of 84, 504 nodes and 178, 238 directed edges. We collect real-time road speed data from HERE map. The grade of each road segment is derived from the elevations of its end nodes provided by the SRTM [17] project. We also pre-process the road network and merge the adjacent road segments with similar grades with tolerance 0.5% to reduce the computational complexity.

Energy consumption model. (Remark: We note that the maximum grade allowed for the inter-state highway is a 6-meter difference in elevation every 100 meters road length in the United States [22].) We use the simulator FASTSim [21] to collect the energy consumption data with driving speed (from 10 mph to 70 mph with a step of 0.2 mph) at different grades (from −6% to 6% with a step of 0.25%). Then we fit the energy consumption data with cubic polynomial functions. We use the parameters of Tesla Semi for the electric truck model with the battery capacity B=1,000 kWh and the total weight of 36 tons. We assume the e-truck is fully charged at the origin, i.e. 0=B.

Origin-destination pair. We collect origin-destination pairs from the FAF [27]. We select 500 origin-destination pairs with distances longer than 800 miles. Those pairs represent 950 billion dollars of freight by trucks in 2017. Table 4 illustrates a subset of the selected origin-destination pairs in the US starting from Los Angeles.

TABLE 4

Five popular origin-destination pairs from Los Angeles.

| Origin | Destination | Distance (miles) | Value (billion USD) |
|---|---|---|---|
| Los Angeles CA | Columbus OH | 1977 | 17.725 |
| Los Angeles CA | Dallas-Fort Worth TX | 1240 | 12.247 |
| Los Angeles CA | Chicago IL | 1745 | 11.293 |
| Los Angeles CA | Nashville TN | 1780 | 10.718 |
| Los Angeles CA | Houston TX | 1373 | 7.837 |

Charging station data. We collect the location data of charging stations from the OSM and add each location to the nearest road segment in the constructed graph. The collected data yields 2, 555 charging stations. We approximate the charging functions with a piecewise linear function using six break points at 0%, 80%, 85%, 90%, 95%, 100% SoC [2]. The resulting charging function can charge the studied electric truck from 0% to 80% in 48 minutes. See FIG. 2 for an illustration. We collect the electricity generation data from EIA [39] and obtain a piecewise linear carbon intensity function $\pi(\bullet)$ for each charging station (See FIG. 1).

In the simulation, we implement and compare the following conceivable alternatives.

C> CARBON: our carbon footprint minimizing approach.

C> ENERGY: our approach with the objective of minimizing energy consumption by setting the carbon intensity function $\pi(\bullet) \equiv 1$.

C> FAST: our approach with the objective of minimizing total travel and charging time by changing the objective and following the similar dualization procedure in Section B.

C> FAST-S: the same path of FAST with the speed planning.

C> FAST-SC: the same path of FAST with the speed planning and charge planning.

C.2. Behavior of Carbon-Optimized Solution

Figure 4:
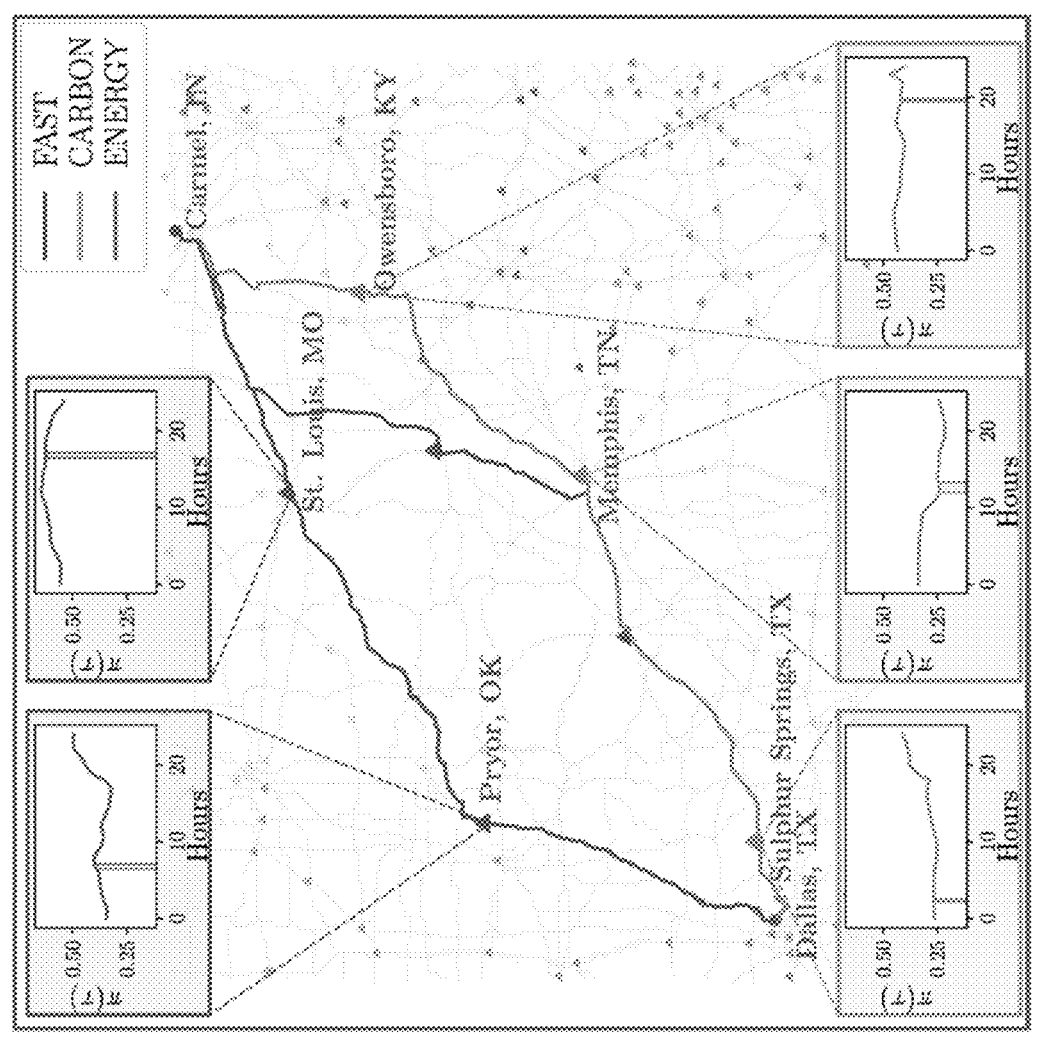
FIG. 4 illustrates carbon-optimized and energy-optimized solutions from Dallas, TX to Carmel, IN, where the shaded area in FIG. 4 represents the period of charging process.

We first study a transportation task from Dallas, TX to Carmel, IN. We compare the solutions of FAST, CARBON and ENERGY and present them in FIG. 4, which illustrates carbon-optimized and energy-optimized solutions from Dallas, TX to Carmel, IN. In FIG. 4, the shaded area represents the period of charging process. We observe that CARBON tends to "follow the sun and go with the wind" to charge the electricity with the low carbon intensity and achieves a 59.6% carbon reduction as compared to FAST and 35.2% as compared to ENERGY. To achieve such a large carbon reduction, CARBON charge a small amount of energy at the first and the third charging station to ensure the sufficient SoC on road while charge more at the second charging station for lower carbon footprint. Meanwhile, the detour to the greener charging station leads to a slightly longer total distance and slightly more energy consumption as compared to the energy-optimized solution. We find similar observations in the next subsection where we conduct the simulation over all 500 origin-destinations.

C.3. Comparison with Baselines

We then conduct simulations on 500 origin-destination pairs. For each pair, we denote by $T_f$ the total travel time of FAST and set deadlines from $1.1T_f$ to $1.5T_f$. We call the ratio between the deadline and $T_f$ the delay factor. The start time is set to 4 PM, Jan. 1, 2022. We set the number of charging stops N of CARBON and ENERGY the same as FAST. In these typical settings, the number of charging stops is no more than eight. We set the ratio of conservative lower bound $\alpha=0.05$. CARBON produces feasible solutions for 96% of all instances. For infeasible solutions, we increase $\alpha$ until it produces a feasible solution. A maximum value of $\alpha=0.12$ guarantees CARBON to produce feasible solutions for all instances.

Figure 5:
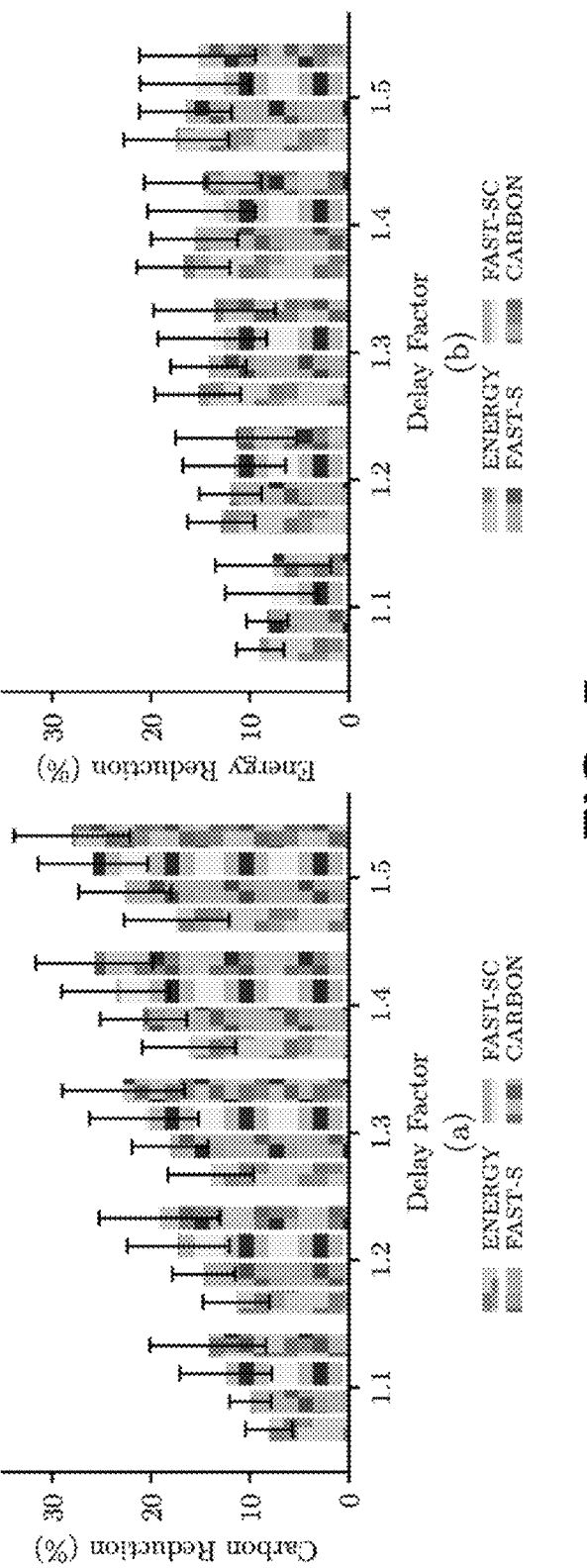
FIG. 5 depicts simulation results on carbon reduction and energy reduction for 500 instances, where subplots (a) and (b) show the results for a carbon-optimized solution and an energy-optimized solution, respectively, and the carbon (energy) reduction is also computed with respect to FAST.

We show the simulation results in FIG. 5. All the results are mean values over 500 origin-destination pairs and the error bars represent the standard deviations. Subplots (a) and (b) of FIG. 5 give the carbon (resp. energy) reduction of different baselines as compared to FAST. We observe that as the deadline gets relaxed, the carbon (and energy) reduction of all the baselines increases. Moreover, different components of the design space contribute differently into such reduction as we shall discuss in the following.

Benefit of Carbon-Optimized Solution. We first compare CARBON and ENERGY. As shown in the subplot (a) of FIG. 5, while the carbon footprint of both approaches decrease as the deadline increases, CARBON benefits more from the relaxed deadline and achieves higher carbon reduction. In particular, CARBON achieves 19% carbon reduction as compared to FAST baseline under the typical setting when the delay factor is 1.2 and up to 28% when the delay factor is 1.5. Meanwhile, as compared to its energy-efficient counterpart ENERGY, CARBON achieves 9% carbon reduction when the delay factor is 1.2 and 13% when the delay factor is 1.5. This difference mainly comes from the fact that minimizing energy simply ignores the temporal diversity of the renewable and loses part of the optimization space. Therefore, minimizing energy consumption does not necessarily lead to a minimum carbon footprint. It is essential to consider the carbon footprint objective when studying the environmental impact of e-trucks. Meanwhile, we also observe from the subplot (b) of FIG. 5 that the difference of energy reduction between CARBON and ENERGY is less than 3%. This means that a carbon-efficient route is also energy-efficient.

Impact of Speed Planning. We then investigate FAST-S to study the impact of speed planning. When the delay factor is 1.2, FAST-S saves 15% carbon footprint and 12% energy as compared to FAST. As compared to ENERGY, FAST-S saves 3% additional carbon footprint. This additional saving comes from the fact that the optimized speed plan re-schedules the travel time of each stage such that the e-truck charges greener electricity at each stage.

Impact of Charging Planning. We then compare FAST-S and FAST-SC to study the impact of charging planning. We observe that when the delay factor is 1.2, FAST-SC saves 2.5% additional carbon footprint as compared to FAST-S because FAST-SC takes the advantage of charging planning such that the e-truck can wait for the lower carbon intensity.

Impact of Path Planning. We then compare FAST-SC and CARBON to study the impact of path planning. We observe that when the delay factor is 1.2, CARBON saves 2% additional carbon footprint as compared to FAST-SC because e-truck can select greener charging stations with path planning.

C.4. Impact of Conservative Ratio α

Figure 6:
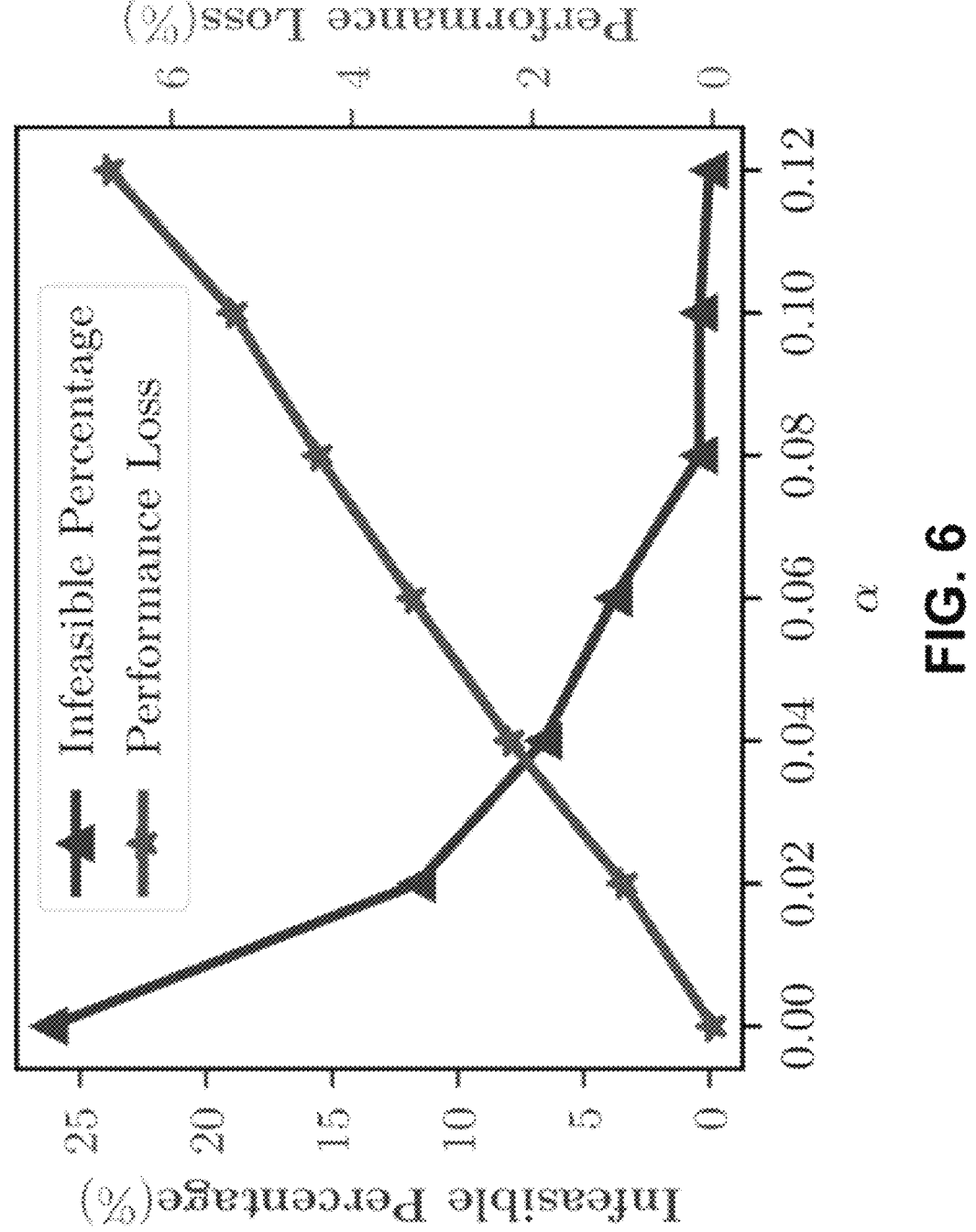
FIG. 6 illustrates an impact of the conservative ratio by running CARBON on 500 origin-destination pairs for the conservative ratio ranging from 0.0 to 0.12.

In this subsection, we study the impact of the conservative ratio α. We run CARBON on 500 origin-destination pairs for α ranging from 0.0 to 0.12. For each a, we check the SoC at each road segment of the solutions and report the percentage of solutions violating positive SoC among all 500 origin-destination pairs. In addition, we notice that CFO with α=0 (named CFO$_0$) provides a lower bound to the CFO with positive SoC constraints at all road segments but no reservation requirement. We thus define performance loss of CARBON with CFO as its relative error with respect to the CARBON with CFO$_0$, i.e.

$$\text{Performance Loss} = \frac{ALG_\alpha - ALG_0}{ALG_0}$$

where $ALG_a$ is the objective value of solutions by CARBON for CFO. The results are presented in FIG. 6, which illustrates impact of the conservative ratio α. We observe that when α=0, there are 26% of infeasible solutions while a small increment of a leads to a large feasibility improvement, e.g., α=0.02 with 12% of infeasible solutions. We observe that α=0.12 is sufficient to guarantee feasibility for all 500 origin-destination pairs. Meanwhile, we observe the performance loss introduced by a grows almost linearly with respect to α. In a typical selection when α=0.06, 96% of solutions are feasible while the performance loss is only 3.3%. In the most conservative case when α=0.12 that guarantees the feasibility of all the solutions, the performance loss is 6.7%. Thus, by introducing the conservative ratio α, we significantly simplify the coupling SoC constraint while ensuring feasibility with minor performance loss.

TABLE 5

| Average carbon reduction with respect to ICE truck over 500 origin-destination pairs. | | | | |
| --- | --- | --- | --- | --- |
| Delay Factor | 1.1 | 1.2 | 1.3 | 1.4 | 1.5 |
| ENERGY | 50.8% | 51.4% | 52.4% | 53.6% | 54.1% |
| CARBON | 54.7% | 55.9% | 57.1% | 58.3% | 59.2% |

C.5. Comparison with ICE Trucks

In this subsection, we study the environmental benefits of electric trucks as compared to ICE trucks. We use the parameters of Kenworth T800 trailer for the ICE truck model with the same total weight of 36 tons. For the ICE truck, we compute the energy-efficient path plan and speed plan by the dual-based method in [14]. We use the $CO_2$ factor value of diesel from EIA to transform the fuel consumption of the ICE truck to its direct carbon emission. The data suggest that if an ICE truck is powered by diesel, it will produce 9.88 kg $CO_2$ per gallon, or equivalently 0.25 kg $CO_2$ emission per kWh. The simulation results are presented in Table 5. We observe that the e-truck saves 55.9% carbon as compared to the ICE truck under a delay factor 1.2.

There are several factors that contribute to such carbon reduction. First, e-trucks consume less energy due to the high efficiency of electric motors and the regenerative braking system. Second, with the increasing integration of renewable generations for e-truck charging, the carbon footprint of an electric truck reduces. Third, our joint optimization of path planning, speed planning and charging planning leads an e-truck to charge clean electricity with low carbon intensity. Overall, these factors together lead to a significant reduction of the carbon footprint of the electric truck as compared to the ICE truck.

D. Discussion

Battery Degradation. The modeling and prediction of battery degradation is in general difficult and still an active research area [26]. Among many factors that affect the battery degradation, the most relevant ones for the transportation tasks are charge or discharge rate and the DoD [34]. A high charge rate or a high DoD may accelerate the battery degradation. To prolong the battery lifetime, we can add a battery degradation cost in the objective. We can model different charging mode by adding multiple charging stations at the same location, where a charging mode with the higher rate incur higher degradation cost. To prevent large DoD, we can also add a degradation cost if the arrival SoC is lower than certain value.

Dynamic Traffic Condition. In the real world, the traffic conditions can be time-varying. To adapt variable traffic conditions in our formulation, we can incorporate the phase-based traffic model [41] into our stage-expanded graph, where the traffic condition is approximately static at each phase. Then we can treat the combination of the stage and the traffic phase as the new stage and apply our approach.

Applications Beyond CFO. We remark that our approach has applications beyond this work. For example, it is also applicable to general routing problem for electric/ICE vehicles with energy consumption and monetary objective.

Our approach is also applicable to the subproblem for EVRP in a branch-price-and-cut framework [15].

E. Embodiments of the Present Disclosure

Embodiments of the present disclosure are elaborated as follows based on the details, examples, applications, etc. as disclosed above.

A first aspect of the present disclosure is to provide a computer-implemented method for co-determining a route plan, a speed plan and an intermediary charging plan for an electric vehicle to travel in a trip from an origin to a destination across a highway network under a hard deadline constraint and one or more SoC constraints. The route plan, speed plan and intermediary charging plan collectively provide an action plan for the electric vehicle to execute so as to accomplish traveling from the origin to the destination. Particularly, the route plan, speed plan and intermediary charging plan are co-determined for CFO. The one or more SoC constraints may be formulated as follows. Let Y be a maximum allowable number of times of charging the electric vehicle during the trip. There are Y SoC constraints in the one or more SoC constraints. An i-th SoC constraint, i between 1 and Y, is that the electric vehicle does not run out of battery when the electric vehicle arrives at a charging station to be used for charging the electric vehicle for the i-th time. The electric vehicle may be an e-truck or a heavy-duty e-truck. Although the disclosed method is particularly advantageous for use by the heavy-duty e-truck, the present disclosure is not limited only to be used by the heavy-duty e-truck; the disclosed method may be used for other types of electric vehicles.

Figure 7:
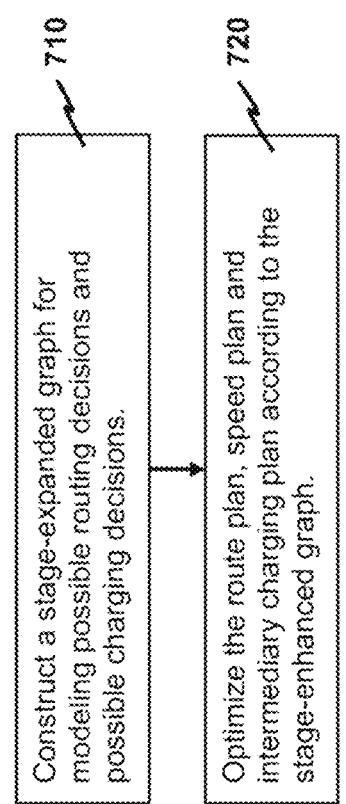
FIG. 7 depicts exemplary steps of a first method as disclosed herein for co-determining a route plan, a speed plan and an intermediary charging plan for an electric vehicle to travel in a trip from an origin to a destination across a highway network under a hard deadline constraint and one or more SoC constraints.

FIG. 7 depicts a workflow showing exemplary steps of the disclosed method (referenced as a first method 700). The first method 700 comprises steps 710 and 720.

In the step 710, a stage-expanded graph is constructed to model possible routing decisions of routing the trip in the highway network and possible charging decisions of charging the electric vehicle during the trip. An individual possible routing decision is an assumption that a certain road segment under consideration in the highway network is selected to be included in the trip. Similarly, an individual possible charging decision is an assumption that a certain charging station under consideration in the highway network is selected to be visited by the electric vehicle and to be used for charging the electric vehicle during the trip. Advantageously, the stage-expanded graph embeds information of arrival time and arrival SoC to thereby facilitate modeling the charging decisions. Details of constructing the stage-expanded graph can be found in Section A.2.

In computer generation of the stage-expanded graph, the stage-expanded graph may be generated by a two-stage process of first generating a transportation graph and then extending the transportation graph to include the possible charging decisions. This two-stage approach in computer implementation of the step 710 may incur less programming complexity over a one-step direct approach. FIG. 8 depicts a flowchart showing steps 810, 820, 830 collectively used for realizing the step 710 in constructing the stage-expanded graph under the two-stage approach.

In the step 810, a transportation graph for modeling the possible routing decisions is prepared. The transportation graph is formed with a plurality of nodes. Each of the nodes is associated with an arriving event of arriving at a corresponding road segment or corresponding charging station in the highway network.

After the transportation graph is prepared, a first number of copies of the plurality of nodes for the stage-expanded graph is created in the step 820. An individual copy of the plurality of nodes is associated with a second number and represents a plurality of respective arriving events occurred at a charging stage that the electric vehicle has been charged for the second number of times during the trip. The first and second numbers may be determined by setting the first number to be Y+1 and selecting the second number from 0 to Y.

In the step 830, the stage-expanded graph is formed with the created first number of copies of the plurality of nodes. It follows that a set of nodes used in the stage-expanded graph consists of the created first number of copies of the plurality of nodes. Edges of the stage-expanded graph are also formed according to the details given in Section A.2.

After the stage-expanded graph is constructed in the step 710, the route plan, speed plan and intermediary charging plan are optimized in the step 720 according to the stage-expanded graph under an objective of minimizing a carbon footprint incurred in the trip while satisfying the hard deadline constraint and the one or more SoC constraints. The route plan, speed plan and intermediary charging plan encompass actual routing and charging decisions selected from the possible routing decisions and possible charging decisions as embedded in the stage-expanded graph. Details of optimizing the above-mentioned three plans can be found in Sections B.1 and B.2. Particularly, it is advantageous and preferable that the three plans as optimized are determined by a dual subgradient method. The dual subgradient method is realizable as Algorithm 1 as disclosed above.

A second aspect of the present disclosure is to provide a method for navigating an electric vehicle during a trip from an origin to a destination across a highway network and advising battery charging during the trip under a hard deadline constraint and one or more SoC constraints. As mentioned above, the electric vehicle may be an e-truck, a heavy-duty e-truck, or any other type of electric vehicle.

Figure 9:
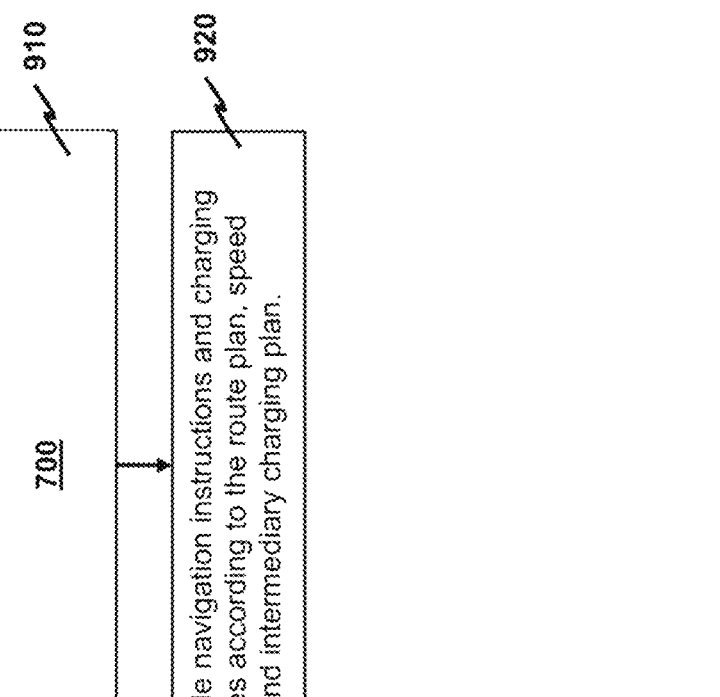
FIG. 9 depicts exemplary steps of a second method as disclosed herein for navigating the electric vehicle according to the route plan, speed plan and intermediary charging plan as determined by the first method.

FIG. 9 depicts a flowchart showing exemplary steps of this method (referenced as a second method 900). The second method 900 comprises steps 910 and 920. In the step 910, a route plan, a speed plan and an intermediary charging plan for the electric vehicle to travel in a trip from the origin to the destination across the highway network under the hard deadline constraint and the one or more SoC constraints are co-determined according to any of the embodiments of the first method 700 as disclosed above. In the step 920, navigation instructions and charging advices to the electric vehicle during the trip are provided according to the route plan, speed plan and intermediary charging plan as co-determined in the step 910. Usually, the electric vehicle is installed with an on-board vehicle navigation system for providing navigation advices to a driver of the electric vehicle. The route plan, speed plan and intermediary charging plan as generated in the step 910 may be received by the navigation system. The navigation instructions and charging advices may be provided to the driver through the navigation system.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.

[1] Ashby, B. H. *Protecting perishable foods during transport by truck*. No. 669. US Department of Agriculture, Office of Transportation, 1987.

[2] Baum, M., Dibbelt, J., Gemsa, A., Wagner, D., and Ziindorf, T. Shortest Feasible Paths with Charging Stops for Battery Electric Vehicles. *Transportation Science* 53 (2019), 1627-1655.

[3] Baum, M., Dibbelt, J., Hiibschle-Schneider, L., Pajor, T., and Wagner, D. Speed-Consumption Tradeoff for Electric Vehicle Route Planning. In 14*Th Workshop on Algorithmic Approaches for Transportation Modelling, Optimization, and Systems* (2014), Schloss Dagstuhl-Leibniz-Zentrum fuer Informatik GmbH, Wadern/Saarbruecken, Germany, p. 14 pages.

[4] Baum, M., Dibbelt, J., Wagner, D., and Ziindorf, T. Modeling and Engineering Constrained Shortest Path Algorithms for Battery Electric Vehicles. *Transportation Science* 54 (2020), 1571-1600.

[5] Bazaraa, M. S., and Sherali, H. D. On the choice of step size in subgradient optimization. *European Journal of Operational Research* 7, 4 (1981), 380-388.

[6] Bekta, s, T., and Laporte, G. The Pollution-Routing Problem. *Transportation Research Part B: Methodological* 45 (2011), 1232-1250.

[7] Bibra, E. M., Connelly, E., Dhir, S., Drtil, M., Henriot, P., Hwang, I., Le Marois, J.-B., McBain, S., Paoli, L., and Teter, J. Global EV outlook 2022: Securing supplies for an electric future.

[8] Boyd, S., and Mattingley, J. Branch and bound methods. *Notes for EE364b, Stanford University* 2006 (2007), 07.

[9] Boyd, S., and Vandenberghe, L. *Convex optimization*. Cambridge university press, 2004.

[10] Boyd, S., Xiao, L., and Mutapcic, A. Subgradient methods. *lecture notes of EE392o, Stanford University, Autumn Quarter* 2004 (2003), 2004-2005.

[11] Camerini, P. M., Fratta, L., and Maffioli, F. On improving relaxation methods by modified gradient techniques. In *Nondifferentiable Optimization*, M. L. Balinski and P. Wolfe, Eds., vol. 3. Springer Berlin Heidelberg, 1975, pp. 26-34. Series Title: Mathematical Programming Studies.

[12] Cela, A., Jurik, T., Hamouche, R., Natowicz, R., Reama, A., Niculescu, S.-I., and Julien, J. Energy Optimal Real-Time Navigation System. *IEEE Intelligent Transportation Systems Magazine* 6 (2014), 66-79.

[13] Davis, S., and Boundy, R. G. Transportation Energy Data Book: Edition 39. Tech. rep., Oak Ridge National Lab. (ORNL), Oak Ridge, TN (United States), 2021.

[14] Deng, L., Hajiesmaili, M. H., Chen, M., and Zeng, H. Energy-efficient timely transportation of long-haul heavy-duty trucks. *IEEE Transactions on Intelligent Transportation Systems* 19 (2017), 2099-2113.

[15] Desaulniers, G., Errico, F., Irnich, S., and Schneider, M. Exact Algorithms for Electric Vehicle-Routing Problems with Time Windows. *Operations Research* 64 (2016), 1388-1405.

[16] Erdoğan, S., and Miller-Hooks, E. A green vehicle routing problem. *Transportation research part E: logistics and transportation review* 48, 1 (2012), 100-114.

[17] Farr, T. G., Rosen, P. A., Caro, E., Crippen, R., Duren, R., Hensley, S., Kobrick, M., Paller, M., Rodriguez, E., Roth, L., et al. The shuttle radar topography mission. *Reviews of geophysics* 45, 2 (2007).

[18] Fernández, E., Leitner, M., Ljubid, I., and Ruthmair, M. Arc routing with electric vehicles: dynamic charging and speed-dependent energy consumption. *Transportation Science* (2022).

[19] Fontana, M. W. *Optimal Routes for Electric Vehicles Facing Uncertainty, Congestion, and Energy Constraints*. PhD thesis, Massachusetts Institute of Technology, 2013.

[20] Goeke, D., and Schneider, M. Routing a mixed fleet of electric and conventional vehicles. *European Journal of Operational Research* 245 (2015), 81-99.

[21] Gonder, J. D., Brooker, A. D., Wood, E. W., and Moniot, M. Future automotive systems technology simulator (fastsim) validation report. Tech. rep., National Renewable Energy Lab. (NREL), Golden, CO (United States), 2018.

[22] Hancock, M. W., and Wright, B. A policy on geometric design of highways and streets. *American Association of State Highway and Transportation Officials: Washington, DC, USA* (2013).

[23] Hartmann, F., and Funke, S. Energy-Efficient Routing: Taking Speed into Account. In *KI* 2014: *Advances in Artificial Intelligence* (Cham, 2014), C. Lutz and M. Thielscher, Eds., Lecture Notes in Computer Science, Springer International Publishing, pp. 86-97.

[24] Hassin, R. Approximation schemes for the restricted shortest path problem. *Mathematics of Operations research* 17, 1 (1992), 36-42.

[25] Hellström, E., Ivarsson, M., Å slund, J., and Nielsen, L. Look-ahead control for heavy trucks to minimize trip time and fuel consumption. *Control Engineering Practice* 17, 2 (2009), 245-254.

[26] Hu, X., Xu, L., Lin, X., and Pecht, M. Battery lifetime prognostics. *Joule* 4, 2 (2020), 310-346.

[27] Hwang, H.-L., Hargrove, S., Chin, S.-M., Wilson, D. W., Lim, H., Chen, J., Taylor, R., Peterson, B., and Davidson, D. The freight analysis framework verson 4 (faf4)-building the faf4 regional database: Data sources and estimation methodologies. Tech. rep., Oak Ridge National Lab. (ORNL), Oak Ridge, TN (United States), 2016.

[28] Juttner, A., Szviatovski, B., Mécs, I., and Rajkó, Z. Lagrange relaxation based method for the qos routing problem. In *Proceedings IEEE INFOCOM* 2001. *Conference on Computer Communications. Twentieth Annual Joint Conference of the IEEE Computer and Communications Society (Cat. No. 01CH37213)* (2001), vol. 2, IEEE, pp. 859-868.

[29] Liu, Q., Zeng, H., and Chen, M. Energy-Efficient Timely Truck Transportation for Geographically-Dispersed Tasks. In *Proceedings of the Ninth International Conference on Future Energy Systems* (Karlsruhe Germany, 2018), ACM, pp. 324-339.

[30] Liu, Y., Seah, H. S., and Shou, G. Constrained energy-efficient routing in time-aware road networks. *GeoInformatica* 21 (2017), 89-117.

[31] Lorenz, D. H., and Raz, D. A simple efficient approximation scheme for the restricted shortest path problem. *Operations Research Letters* 28, 5 (2001), 213-219.

[32] Maji, D., Sitaraman, R. K., and Shenoy, P. DACF: day-ahead carbon intensity forecasting of power grids using machine learning. In *Proceedings of the Thirteenth ACM International Conference on Future Energy Systems* (2022), ACM, pp. 188-192.

[33] Montoya, A., Guéret, C., Mendoza, J. E., and Villegas, J. G. The electric vehicle routing problem with nonlinear charging function. *Transportation Research Part B: Methodological* 103 (2017), 87-110.

[34] Pelletier, S., Jabali, O., Laporte, G., and Veneroni, M. Battery degradation and be-haviour for electric vehicles: Review and numerical analyses of several models. *Transportation Research Part B: Methodological* 103 (2017), 158-187.

[35] Schneider, M., Stenger, A., and Goeke, D. The Electric Vehicle-Routing Problem with Time Windows and Recharging Stations. *Transportation Science* 48 (2014), 500-520.

[36] Storandt, S. Quick and energy-efficient routes: Computing constrained shortest paths for electric vehicles. In *Proceedings of the 5th ACM SIGSPATIAL International Workshop on Computational Transportation Science* (New York, NY, USA, 2012), IWCTS '12, Association for Computing Ma-chinery, pp. 20-25.

[37] Strehler, M., Merting, S., and Schwan, C. Energy-efficient shortest routes for electric and hybrid vehicles. *Transportation Research Part B: Methodological* 103 (2017), 111-135.

[38] Su, J., Chen, M., and Zeng, H. Energy efficient timely transportation: A comparative study of internal combustion trucks and electric trucks. In *Proceedings of the 8th ACM International Conference on Systems for Energy-Efficient Buildings, Cities, and Transportation* (New York, NY, USA, 2021), BuildSys '21, Association for Computing Machinery, p. 224-225.

[39] U.S. Energy Information Administration. June 2021 monthly energy review. Tech. rep., 2021.

[40] Wang, Y., Jiang, J., and Mu, T. Context-Aware and Energy-Driven Route Optimization for Fully Electric Vehicles via Crowdsourcing. *IEEE Transactions on Intelligent Transportation Systems* 14 (2013), 1331-1345.

[41] Xu, W., Liu, Q., Chen, M., and Zeng, H. Ride the Tide of Traffic Conditions: Opportunistic Driving Improves Energy Efficiency of Timely Truck Transportation. In *Proceedings of the 6th ACM International Conference on Systems for Energy-Efficient Buildings, Cities, and Transportation* (New York, NY, USA, 2019), BuildSys '19, Association for Computing Machinery, pp. 169-178.

[42] Zhang, Y., Qu, X., and Tong, L. Optimal eco-driving control of autonomous and electric trucks in adaptation to highway topography: Energy minimization and battery life extension. *IEEE Transactions on Transportation Electrification* 8, 2 (2022), 2149-2163.

[43] Zhou, R., Liu, Q., Xu, W., Chen, M., and Zeng, H. Minimizing emission for timely truck transportation with adaptive fuel injection. In *Proceedings of the 7th ACM International Conference on Systems for Energy-Efficient Buildings, Cities, and Transportation* (2020), pp. 240-249.

What is claimed is:

1. A computer-implemented method for co-determining a route plan, a speed plan and an intermediary charging plan for an electric vehicle to travel in a trip from an origin to a destination across a highway network under a hard deadline constraint and one or more state-of-charge (SoC) constraints, the method comprising:

constructing a stage-expanded graph to model possible routing decisions of routing the trip in the highway network and possible charging decisions of charging the electric vehicle during the trip, wherein the stage-expanded graph embeds information of arrival time and arrival SoC to thereby facilitate modeling the charging decisions; and optimizing the route plan, speed plan and intermediary charging plan according to the stage-expanded graph under an objective of minimizing a carbon footprint incurred in the trip while satisfying the hard deadline constraint and the one or more SoC constraints;

wherein the constructing of the stage-expanded graph comprises:

preparing a transportation graph for modeling the possible routing decisions, wherein the transportation graph includes a plurality of nodes, an individual node being associated with an arriving event of arriving at a corresponding road segment or corresponding charging station in the highway network;

creating a first number of copies of the plurality of nodes for the stage-expanded graph, wherein an individual copy of the plurality of nodes is associated with a second number and represents a plurality of respective arriving events occurred at a charging stage that the electric vehicle has been charged for the second number of times during the trip; and forming the stage-expanded graph with the created first number of copies of the plurality of nodes, wherein the first number is given by Y+1 and the second number is selected from 0 to Y, where Y is a maximum allowable number of times of charging the electric vehicle during the trip.

2. The method of claim 1, wherein the one or more SoC constraints consist of Y SoC constraints, wherein an i-th SoC constraint, i between 1 and Y, is that the electric vehicle does not run out of battery when the electric vehicle arrives at a charging station to be used for charging the electric vehicle for the i-th time.

3. The method of claim 1, wherein the route plan, speed plan and intermediary charging plan as optimized are determined by a dual subgradient method.

4. The method of claim 1, wherein the electric vehicle is an e-truck.

5. A method for navigating an electric vehicle during a trip from an origin to a destination across a highway network and advising battery charging during the trip under a hard deadline constraint and one or more state-of-charge (SoC) constraints, the method comprising:

co-determining a route plan, a speed plan and an intermediary charging plan for the electric vehicle to travel in a trip from the origin to the destination across the highway network under the hard deadline constraint and the one or more SoC constraints according to the method of claim 1; and providing navigation instructions and charging advices to the electric vehicle during the trip according to the route plan, speed plan and intermediary charging plan.

*   *   *   *   *